United States Patent
Lau

(10) Patent No.: US 9,983,856 B2
(45) Date of Patent: May 29, 2018

(54) TRANSACTION FLOW VISUALIZATION

(71) Applicant: CA, Inc., Islandia, NY (US)

(72) Inventor: Rich J. Lau, Deer Park, NY (US)

(73) Assignee: CA, Inc., Islandia, NY (US)

( * ) Notice: Subject to any disclaimer, the term of this patent is extended or adjusted under 35 U.S.C. 154(b) by 0 days. days.

(21) Appl. No.: 14/991,001

(22) Filed: Jan. 8, 2016

(65) Prior Publication Data

US 2017/0199727 A1 Jul. 13, 2017

(51) Int. Cl.
*G06F 9/44* (2018.01)
*G06F 3/0484* (2013.01)

(52) U.S. Cl.
CPC .............. *G06F 8/35* (2013.01); *G06F 3/0484* (2013.01); *G06F 8/70* (2013.01)

(58) Field of Classification Search
CPC .................................................. G06F 11/3466
See application file for complete search history.

(56) References Cited

U.S. PATENT DOCUMENTS

| | | |
|---|---|---|
| 5,345,587 A | 9/1994 | Fehskens et al. |
| 5,450,586 A | 9/1995 | Kuzara et al. |
| 5,576,965 A | 11/1996 | Akasaka et al. |
| 6,122,627 A | 9/2000 | Carey et al. |
| 6,134,540 A | 10/2000 | Carey et al. |
| 6,243,092 B1 | 6/2001 | Okita et al. |
| 6,810,368 B1 | 10/2004 | Pednault |
| 6,879,946 B2 | 4/2005 | Rong et al. |
| 6,883,162 B2 | 4/2005 | Jackson et al. |
| 6,957,199 B1 | 10/2005 | Fisher |
| 7,376,549 B2 | 5/2008 | Horikawa |
| 7,437,710 B2 | 10/2008 | Bau et al. |
| 7,487,508 B2 | 2/2009 | Fu et al. |
| 7,539,980 B1 | 5/2009 | Bailey et al. |
| 7,552,036 B2 | 6/2009 | Oslake et al. |
| 7,676,538 B2 | 3/2010 | Potter et al. |
| 7,783,613 B2 | 8/2010 | Gupta et al. |
| 7,805,496 B2 | 9/2010 | Aiber et al. |
| 7,873,594 B2 | 1/2011 | Harada et al. |

(Continued)

OTHER PUBLICATIONS

Wikipedia, "Mock Object," Sep. 23, 2008, printed May 31, 2009, http://en.wikipedia.org/wiki/Mock_object, pp. 1-5.

(Continued)

*Primary Examiner* — Hang Pan
(74) *Attorney, Agent, or Firm* — Alliance IP, LLC

(57) ABSTRACT

Transaction data is accessed and a flow of a particular one of the plurality of transactions is determined from the transaction data, the flow describing involvement of a particular set of the software components in the particular transaction and a plurality of transaction fragments of the particular transaction. A duration of each of the plurality of transaction fragments can be determined and a graphical representation of the flow can be generated that includes a set of graphical block elements and a set of graphical connector elements, each of the graphical block elements representing a respective software component, each of the graphical connector elements representing a respective one of the transaction fragments, where a particular one of the graphical connector elements is formatted based on the respective duration determined for the corresponding transaction fragment.

17 Claims, 24 Drawing Sheets

(56) References Cited

U.S. PATENT DOCUMENTS

| | | |
|---|---|---|
| 7,966,183 B1 | 6/2011 | Kryskow et al. |
| 8,060,864 B1 | 11/2011 | Michelsen |
| 8,112,262 B1 | 2/2012 | Michelsen |
| 8,327,377 B2 | 12/2012 | Krishnamurthy et al. |
| 8,538,740 B2 | 9/2013 | Kumar et al. |
| 8,898,681 B1 | 11/2014 | Acheff et al. |
| 8,935,573 B2 | 1/2015 | Horsman et al. |
| 9,201,767 B1 | 12/2015 | Tarlton et al. |
| 9,323,645 B2 | 4/2016 | Michelsen |
| 9,531,609 B2 | 12/2016 | Talot et al. |
| 2002/0010781 A1 | 1/2002 | Tuatini |
| 2003/0055670 A1 | 3/2003 | Kryskow et al. |
| 2003/0217162 A1 | 11/2003 | Fu et al. |
| 2004/0078782 A1 | 4/2004 | Clement et al. |
| 2004/0128259 A1 | 7/2004 | Blakeley et al. |
| 2004/0162778 A1 | 8/2004 | Kramer et al. |
| 2004/0230674 A1 | 11/2004 | Pourheidari et al. |
| 2004/0243334 A1 | 12/2004 | Wrigley et al. |
| 2004/0243338 A1 | 12/2004 | Sabiers et al. |
| 2005/0027648 A1 | 2/2005 | Knowles et al. |
| 2005/0063335 A1 | 3/2005 | Shenfield et al. |
| 2005/0198401 A1 | 9/2005 | Chron et al. |
| 2005/0289231 A1 | 12/2005 | Harada et al. |
| 2006/0224375 A1 | 10/2006 | Barnett et al. |
| 2006/0235675 A1 | 10/2006 | Oslake et al. |
| 2007/0006177 A1 | 1/2007 | Aiber et al. |
| 2007/0033442 A1 | 2/2007 | Tillmann et al. |
| 2007/0073682 A1 | 3/2007 | Adar et al. |
| 2007/0169003 A1 | 7/2007 | Branda et al. |
| 2007/0261035 A1 | 11/2007 | Duneau |
| 2007/0277158 A1 | 11/2007 | Li et al. |
| 2008/0010074 A1 | 1/2008 | Brunswig et al. |
| 2008/0120129 A1 | 5/2008 | Seubert et al. |
| 2008/0120573 A1* | 5/2008 | Gilbert ............... G06F 3/04817 715/835 |
| 2008/0127093 A1 | 5/2008 | Fernandez-Ivern et al. |
| 2008/0278478 A1 | 11/2008 | Dillenberger et al. |
| 2009/0064149 A1 | 3/2009 | Singh et al. |
| 2009/0094684 A1 | 4/2009 | Chinnusamy et al. |
| 2009/0119301 A1 | 5/2009 | Cherkasova et al. |
| 2009/0187534 A1 | 7/2009 | Broll et al. |
| 2009/0204669 A1 | 8/2009 | Allan |
| 2009/0234710 A1 | 9/2009 | Hassine et al. |
| 2009/0282403 A1 | 11/2009 | Poole et al. |
| 2009/0298458 A1 | 12/2009 | Bakker et al. |
| 2010/0037100 A1 | 2/2010 | Lopian |
| 2010/0145962 A1 | 6/2010 | Chen et al. |
| 2010/0318974 A1 | 12/2010 | Hrastnik et al. |
| 2012/0059868 A1 | 3/2012 | Buckl et al. |
| 2012/0084754 A1 | 4/2012 | Ziegler et al. |
| 2014/0108589 A1 | 4/2014 | Dhanda |
| 2014/0223418 A1 | 8/2014 | Michelsen et al. |
| 2015/0205699 A1 | 7/2015 | Michelsen |
| 2015/0205700 A1 | 7/2015 | Michelsen |
| 2015/0205701 A1 | 7/2015 | Michelsen |
| 2015/0205702 A1 | 7/2015 | Michelsen |
| 2015/0205703 A1 | 7/2015 | Michelsen |
| 2015/0205708 A1 | 7/2015 | Michelsen |
| 2015/0205709 A1* | 7/2015 | Michelsen ............ G06F 11/323 714/38.1 |
| 2015/0205712 A1 | 7/2015 | Michelsen |
| 2015/0205713 A1 | 7/2015 | Michelsen |
| 2016/0125052 A1 | 5/2016 | Dahan et al. |
| 2016/0239409 A1 | 8/2016 | de Oliveira Staudt et al. |
| 2017/0075799 A1 | 3/2017 | Lau |
| 2017/0200097 A1 | 7/2017 | Lau et al. |
| 2017/0200098 A1 | 7/2017 | Lau |

OTHER PUBLICATIONS

Lisa, 2.0 User's Guide, Interactive TKO, Feb. 27, 2003, pp. 1-130.
Lisa, 2.0 Developer's Guide, Interactive TKO, Mar. 13, 2003, pp. 1-23.
Chapter 5—Service Discovery, Bluetooth Application Developer's Guide, 2002 (pp. 167-209).
Chatterjee, S., "Messaging Patterns in Service-Oriented Architecture, Part 1," msdn.microsoft.com/en-us/library/aa480027.aspx, Apr. 2004, (pp. 1-21).
Time to live—Wikipedia, the free encyclopedia; 2015; pp. 1-3. http://en.wikipedia.org/wikiiTime_to_live>, examiner annotated document.
Web Discussion: "Is TCP protocol stateless or not?" available online at "http://stackoverflow.com/questions/19899236/is-tcp-protocol-statelessor-not" pp. 1-3 (2013).
Joyce, Chris, "Venn Diagrams," Assessment Resource Banks, 2008 <arbs.nzcer.org.nz/venn-diagrams.>.

* cited by examiner

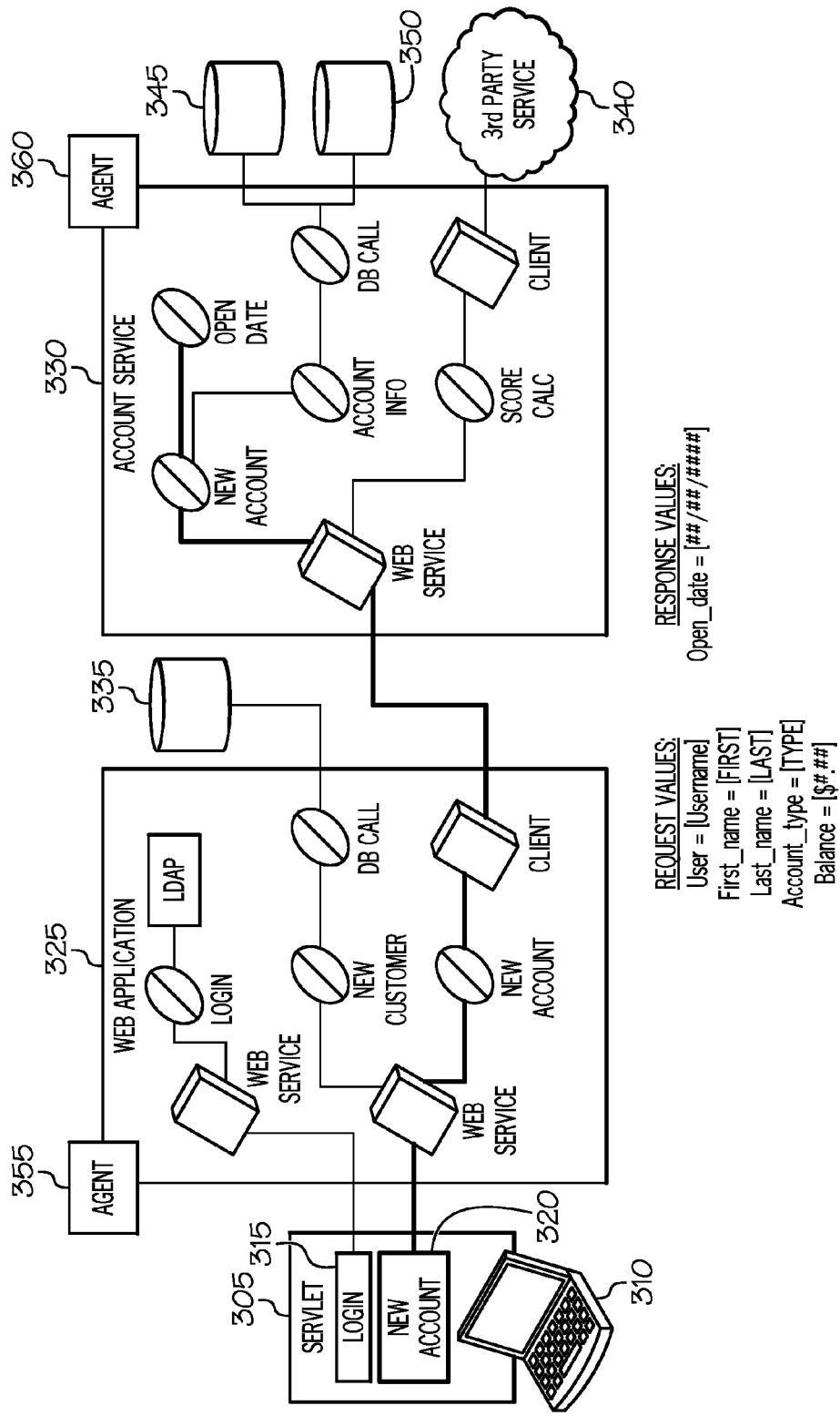

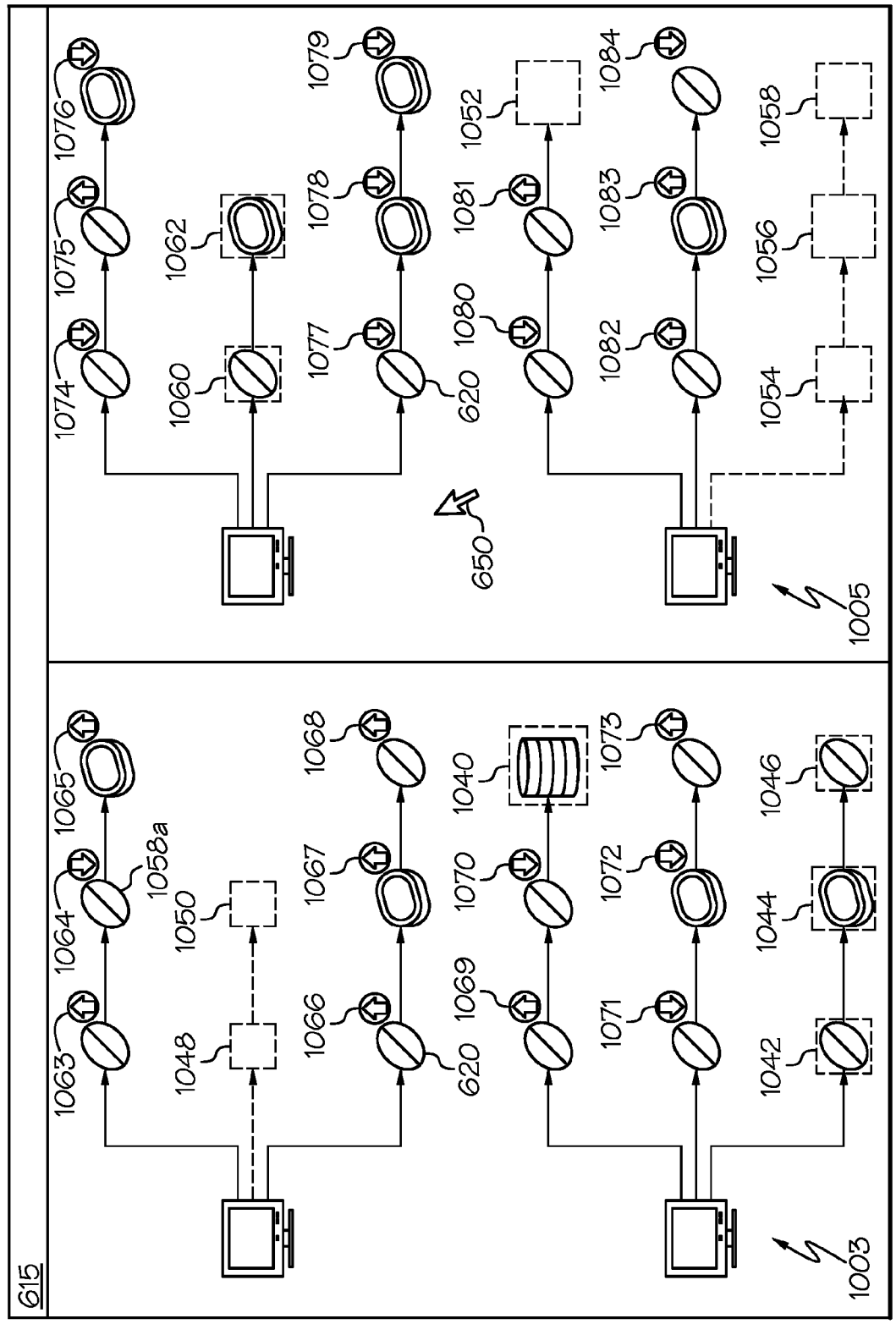

TRANSACTION FLOW VISUALIZATION

BACKGROUND

The present disclosure relates in general to the field of computer systems analysis, and more specifically, to automatically inspecting computer software system architecture.

Modern distributed software systems can enable transactions that cross system and network boundaries, with backend systems communicating with additional backend systems to generate results or provide a service for a client. As an example, online travel reservation systems often involve a frontend website with which users interact on their browser. To search for and complete a reservation in response to a user's request, the host of the travel reservation site may interact with other backend services, including services and systems provided by third parties, such as airlines, car rental companies, hotel companies, credit card payment systems, and so on. These third party services may, themselves, also communicate with and consume services of still further systems, resulting in a chain of transactions and dependencies in response to a single user's request. Additionally, each system itself may be composed of multiple different sub-systems, or components, that interact with each other (and even other systems) in different ways depending on the transaction.

While the breadth and sophistication of the services provided by distributed systems continues to expand and enrich users' lives, the complexity of these systems, their components, and their interoperation also increases. Indeed, it is not uncommon for multiple different enterprises and their systems to be involved in a single transaction. Even within transaction performed by a single entity's system, the multiple composite components of that system are often developed by and "owned" by distinct development teams, with few if any developers or administrators having an in-depth global knowledge of the system and all of its composite parts. This can pose a challenge to developers and administrators as they seek to modify, update, test, verify, and develop components for such software systems.

BRIEF SUMMARY

According to one aspect of the present disclosure, transaction data can be accessed that was generated during monitoring of a plurality of transactions involving a plurality of software components in a system. A flow of a particular one of the plurality of transactions can be determined from the transaction data, the flow of the particular transaction describing involvement of a particular set of the plurality of software components in the particular transaction and a plurality of transaction fragments of the particular transaction. A duration of each of the plurality of transaction fragments can be determined and a graphical representation of the flow can be generated for presentation in a graphical user interface. The graphical representation include a set of graphical block elements and a set of graphical connector elements, each of the graphical block elements representing a respective one of the plurality of software components, each of the graphical connector elements representing a respective one of the plurality of transaction fragments and connecting the graphical block elements of the respective software components involved in the corresponding transaction fragment, and a particular one of the graphical connector elements representing a particular one of the plurality of software components can be formatted based on the respective duration determined for the particular transaction fragment.

According to another aspect of the present disclosure, transaction data can be accessed that was generated during monitoring of a plurality of transactions of a particular type, the plurality of transactions involving a plurality of software components in a system and each transaction including at least a subset of a plurality of transaction fragments observed in the plurality of transactions. A respective transaction flow for each of the plurality of transactions can be determined from the transaction data, each transaction flow identifying a respective order of the transaction fragments of the corresponding transaction and the software components that participated in the transaction. A collective transaction flow can be determined for the particular type of transaction representing a union of the transaction flows determined for the plurality of transactions. A number of instances of each of the plurality of transaction fragments observed during the monitoring can be determined and a graphical representation of the collective transaction flow can be generated that includes a plurality of graphical block elements and a plurality of graphical connector elements. Each of the graphical block elements represents a respective one of the plurality of software components, each of the graphical connector elements represents a respective one of the plurality of transaction fragments and connects the graphical block elements of the respective software components involved in the corresponding transaction fragment, and a particular one of the graphical connector elements is formatted according to the respective determined number of instances of a corresponding particular transaction fragment.

BRIEF DESCRIPTION OF THE DRAWINGS

FIGS. 4A-4F are simplified block diagrams illustrating example transaction flow paths involving the example system of FIG. 3 in accordance with at least one embodiment;

FIGS. 10A-10C are screenshots of example graphical user interfaces provided in connection with a transaction flow differential analysis supported by a transaction analysis system in accordance with at least one embodiment;

Like reference numbers and designations in the various drawings indicate like elements.

DETAILED DESCRIPTION

Figure 1:
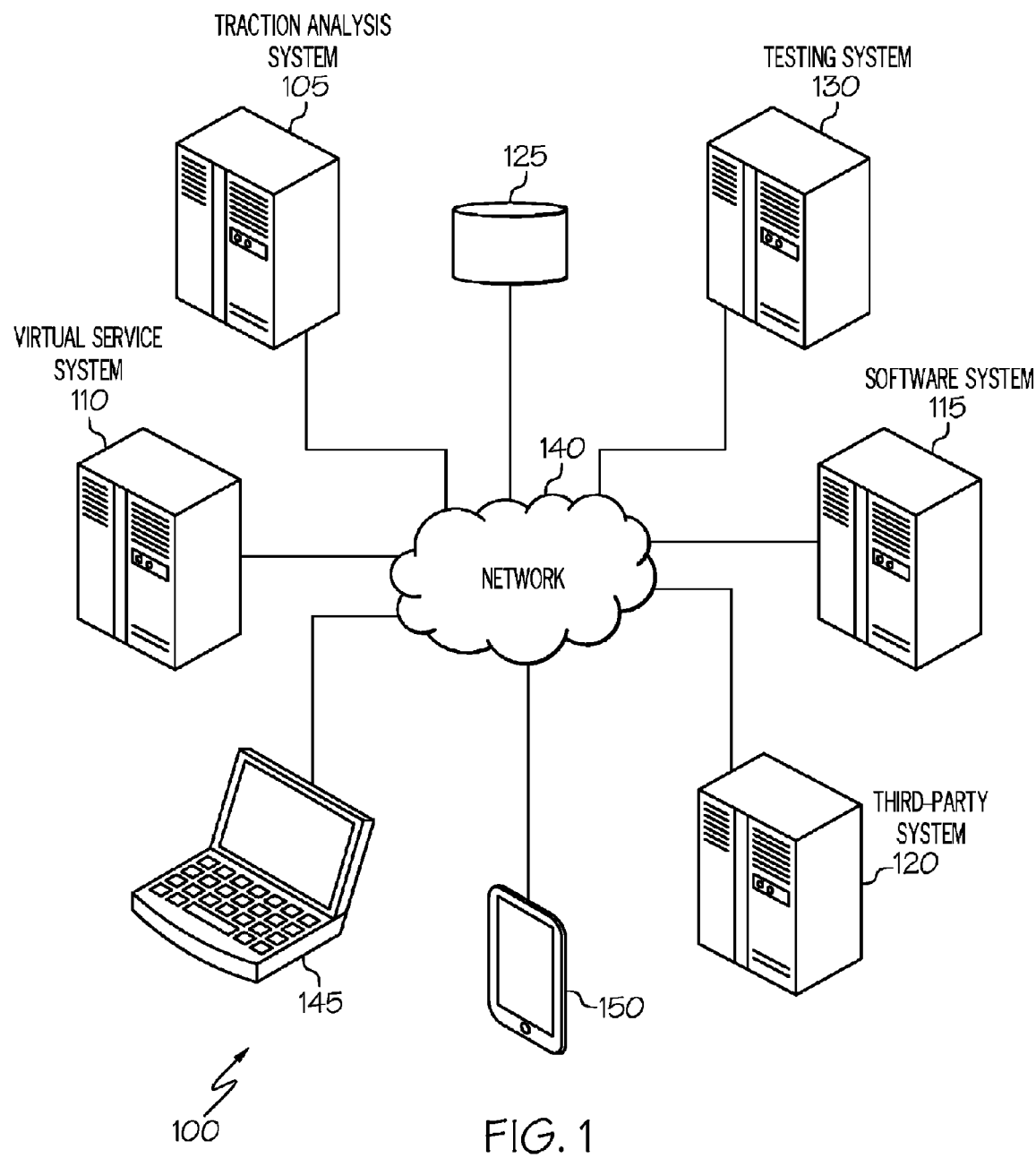
FIG. 1 is a simplified schematic diagram of an example computing system including an example transaction analysis system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," " module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, a simplified block diagram is shown illustrating an example computing system 100 including a transaction analysis system 105, virtual service system 110, testing system 130, among other hardware and software computing systems. In some implementations, functionality of the transaction analysis system 105, virtual service system 110, testing system 130, and other systems and components described herein can be combined or even further divided and implemented among multiple different systems. Transaction analysis system 105 can include logic and functionality, implemented in software and/or hardware, for monitoring software transactions involving multiple different software components interacting within the transaction. The transaction analysis system 105 can sort transaction data generated from this monitoring and assess the transaction data to determine transaction fragments for each transaction. Each transaction fragment can include an interaction between two different software components within the transaction. The software components can be components of the same or different application(s), can be hosted on the same machine, in different machines within a local network, or different remote machines on a wide area network. Each transaction can include multiple transaction fragments. The transaction analysis system 105 can determine, from the transaction data, the ordering of the composite fragments of each transaction as well as the flow of each transaction (e.g., how the transaction proceeds from component to component until completion, as well as the potential alternative paths of the transaction (e.g., according to various decision points within the transaction)). A graphical representation of the transaction, its flow, and the components involved in the transaction can be generated. Other transactions supported by a system (or particular portion of the system) can also be identified from the transaction data and similar flow paths identified. Graphical representations of the collection of transactions supported by a system can be presented in a single view, in some implementations.

In some instances, additional enhancements can be applied to graphical representations of monitored transactions by the transaction analysis system. For instance, in one example, transaction analysis system 105 can also include logic to allow users to interact with portions of the graphical representations to "tag" various portions of the transaction flows that are of particular interest to the user. These tags can allow the particular portions of the transaction flow(s) to be easily re-identified and referenced for other users (e.g., in connection with a debugging or testing exercise). In some instances, transaction analysis system 105 can also include logic to determine deltas between the transaction flows as monitored and determined at two different points in time. Graphical representations of one or more of the involved transaction flows can be augmented to show how the transaction flow changed from a previous "recording" of the transaction by the transaction analysis system 105. In still another example, the transaction analysis system 105 can also include logic to determine the duration of each transaction fragment in a transaction as well as potentially other performance metrics. The transaction analysis system 105 can enhance presentations of transactions to highlight trends or relative performance in the timing or other performance characteristics of the transactions. For instance, the transaction analysis can augment graphical representations of the transactions to identify those transaction fragments or transactions that are most utilized, among other enhancements to improve users' abilities to utilize and glean information from the presented graphical representations of transaction flows determined by the transaction analysis system 105.

In some instances, transaction data and transaction flow data generated by transaction analysis system 105 can be used in other systems. For instance, some software systems (e.g., 115) can utilize, consume data and services of, provide data or services to, or otherwise be at least partially dependent on or function in association with one or more other computing systems, including third party computing systems (e.g., 120), or data stores, such as database 125, among other examples. Further, virtual models can be generated from captured transaction data that simulate the actions of other systems and software components with which a system under test (e.g., 115) interacts. For instance, a test can be developed for execution by testing system 130 that can make use of virtualized instances (or models) of a third party system (e.g., 120), database (e.g., 125), or other systems and system components, including local system components. These virtualized instances can stand-in for and simulate actions and communication of the corresponding real world components and can interact with the system under test, among other examples One or more computing systems and services can be hosted on machines communicatively coupled by one or more networks (e.g., 140), including local networks, public networks, wide area networks, broadband cellular networks, the Internet, and the like. Systems with which a system (e.g., 115) under test, development, used in training, etc. can interact can include other data stores (e.g., 125), systems (e.g., 120), and constituent software components accessible over the one or more networks 140. Further, systems and services (e.g., 105, 110, 130, etc.) provided to assess, test, and simulate one or more of systems 115, 120, 125, etc. can also be provided local to or remote from (e.g., over network 140) the target systems, among other examples. Additionally, computing environment 100 can include one or more user devices (e.g., 145, 150) that can allow users to interact with one or more of the servers, services, data structures, and services (e.g., 105, 110, 115, 120, 125, 130, etc.) provided, for instance, remotely over network 140, or at least partially local to the user devices (e.g., 145, 150), among other examples.

In general, "servers," "clients," "computing devices," "network elements," "hosts," "system-type system entities," "user devices," and "systems" (e.g., 105, 120, 125, 130, 145, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 120, 125, 130, 145, 150, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a transaction analysis system 105, virtual service system 110, system under test (e.g., 115) or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Software system architectures can be visualized using graphical representations based on monitored transactions involving the system(s). For instance, a graphical representation of a transaction can be generated that illustrates a portion of the system's architecture as well as the flow of the transactions supported by the system (or a particular portion of the system). Similar graphical representations can be generated for any one of several transactions monitored by a transaction analysis system.

Software components within a system may not be single purpose in that they are capable of interfacing with potentially multiple other software components and participating in potentially multiple different transactions and transaction types. Accordingly, the same software component may appear in any one of multiple different transaction flow diagrams generated from corresponding transaction data. In still other implementations, the same transaction fragment (e.g., request-response between two particular software components) may be included in two (or more) different transactions. Further, in modern software development, changes and updates to the system may take place at a much higher frequency (e.g., according to principles of Agile or iterative development) and it can be difficult for all developer-users involved with the system to keep pace with these frequent incremental changes to the system. Further, it can be difficult to visualize how one change other software components, such as other components which interact with or are dependent on the changed component in one or more transactions, as well as how the change might affect performance of various transactions or transaction fragments supported by the system, among other issues. For instance, changes to a particular software component may affect the particular component, other components, and related transactions in unintended or unexpected ways. Accordingly, understanding the entire scope of a proposed or actual change to a software component can be difficult, particularly in a complex or distributed software environment. Traditional graphical representations of transactions fail to adequately represent such information about transaction flows of a system, among other example shortcomings.

Figure 2:
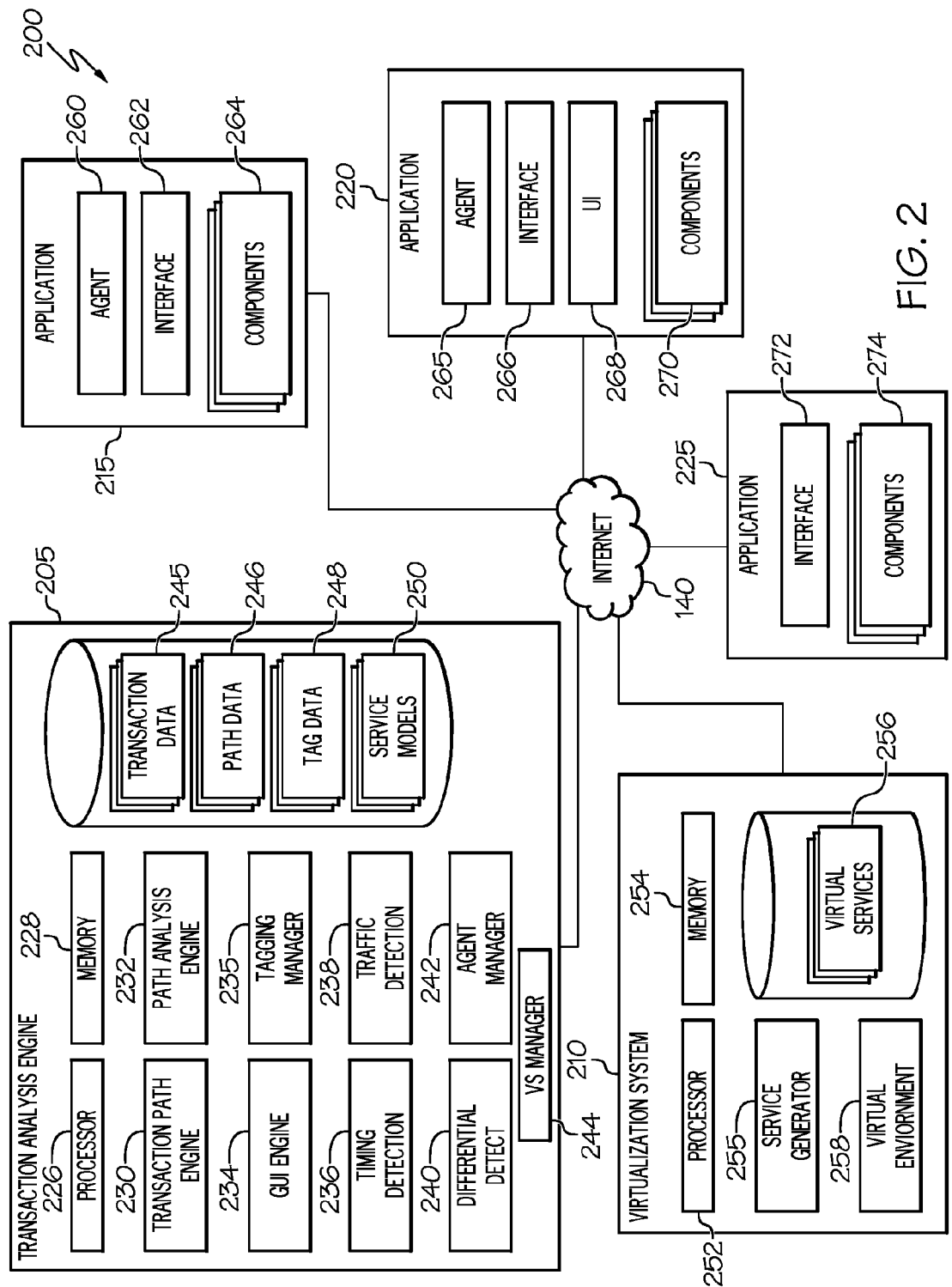
FIG. 2 is a simplified block diagram of an example computing system including an example transaction analysis system in accordance with at least one embodiment.

At least some of the systems described in the present disclosure, such as the systems of FIGS. 1 and 2, can include functionality that, in some cases, at least partially remedy or otherwise address at least some of the above-discussed deficiencies and issues, as well as others not explicitly described herein. For instance, tools can be provided that leverage the transaction data and transaction path information generated by a transaction analysis system 105 to enhance graphical representations of transaction flows determined by and presented in graphical user interfaces (GUIs) of a system. Such enhancements can include specialized formatting of the graphical elements making up the graphical representations of these transaction flows, such as to show which transactions and transaction fragments are most frequently used, which perform the fastest or most efficiently, among other characteristics. Further GUI enhancements can include allowing user interactions with the graphical representations of transaction flows to include user tagging of specific software components and transaction fragments and generating delta views of past transaction recordings of a system (or portion of a system) with current transaction recordings, among other examples.

Turning to the example of FIG. 2, a simplified block diagram 200 is shown illustrating an example environment 200 including a transaction analysis engine 205, a virtualization system 210, and one or more services, database management systems, programs, or applications (referred to in this example collectively as "applications"). The systems 205, 210, 215, 220, 225, etc. can interact, for instance, over one or more networks 140. In one example implementation, a transaction analysis engine 205 can include one or more processor devices (e.g., 226) and one or more memory elements (e.g., 228) for use in executing one or more components, tools, or modules, or engines, such as a transaction path engine 230, path analysis engine 232, a graphical user interface (GUI) engine 234, a tagging manager 235, timing detection engine 236, traffic detection engine 238, transaction differential detection 240, agent manager 242, virtual service manager 244, among other potential tools and components including combinations or further compartmentalization of the foregoing. In some implementations, transaction analysis engine 205 can be implemented as multiple different systems including, for example, varying combinations of the foregoing components and tools (e.g., 230, 232, 234, 235, 236, 238, 240, 242, 244, etc.) and accompanying data (e.g., 245, 246, 248, 250, etc.).

In one example, transaction analysis engine 205 can include a transaction path engine 230 configured to inspect a particular application (e.g., 215, 20, 225) or combination of co-functioning applications (e.g., 215 and 220) to identify one or more transactions involving the application(s) including the respective software components (e.g., 264, 270, 274) of the applications (e.g., 215, 220, 225) invoked and utilized within the transaction. Information gathered from monitoring or inspection of the transaction can be stored in transaction data 245. Further, the flow path of the transactions can additionally be identified and flow path data 246 can be generated (e.g., using transaction path engine 230) describing the flow between software components (e.g., 264, 270, 274) and the respective contributions, operations, processes, or transaction fragments of the applications within the flow.

In some implementations, transaction path engine 230 can operate cooperatively with an agent manager (e.g., 242) (or other component of the transaction analysis engine 205) interfacing with or otherwise managing one or more instrumentation agents (or "agents") (e.g., 260, 265) deployed on one or more applications (e.g., 215, 220) for use in aiding the monitoring of performance of various components (e.g., 264, 270) of the applications. Agents (e.g., 260, 265) can be software-implemented agents that are configured to provide visibility into the operations of one or more software component (e.g., 264, 270, etc.). Each agent can be configured, for example, to detect requests and responses being sent to and from the component or application in which that agent is embedded. Each agent (e.g., 260, 265) can be further configured to generate information about the detected requests and/or responses and to report that information to other services and tools, such as agent manager 242, virtualization system 210, transaction path engine 230, etc. Such information can be embodied in transaction data 245. Additionally, each agent can be configured to detect and report on activity that occurs internal to the components in which the instrumentation agent is embedded or which the agent is otherwise capable of monitoring. Agents can be implemented in a variety of ways, including instrumenting each component with a corresponding agent, instrumenting an application or other collection of the software components with a single, shared agent, among other examples.

In response to detecting a request, response, and/or other activity to be monitored, each agent (e.g., 260, 265) can be configured to detect one or more characteristics associated with that activity and/or the monitoring of that activity by the agent. The characteristics can include a frame identifier, which identifies a message, with respect to the agent, sent by the instrumentation agent to a managing service, such as agent manager 242 to report the characteristics observed by the agent. For instance, pieces of transaction data 245 can be embodied as transaction data frames. Transaction data frames can include a parent identifier, which identifies the requester that generated the request sent to the component or sub-component monitored by the instrumentation agent; a transaction identifier, identifying the transaction, with respect to the component or sub-component being monitored, such as transactions between components carried out through communications and calls made over one or more network connections; and an agent identifier that identifies the agent, with respect to the other instrumentation agents in the testing system, that is generating the characteristics, among other characteristics. Such characteristics can include other information such as a system clock value, current processor and/or memory usage, contents of the request, contents of the response to the request, identity of the requester that generated the request, identity of the responder generating the response to the request, Java virtual machine (JVM) statistics, standard query language (SQL) queries (SQLs), number of database rows returned in a response, logging information (e.g., messages logged in response to a request and/or response), error messages, simple object access protocol (SOAP) requests, values generated by the component that includes the instrumentation agent but that are not returned in the response to the request, web service invocations, method invocations (such as Enterprise Java Beans (EJB) method invocations), entity lifecycle events (such as EJB entity lifecycle events), heap sizing, identification of network connections involved in transactions, identification of messages and data exchanged between components, including the amount of such data, and the like. Characteristics can also include the thread name of a thread processing the request to generate the response and other data describing threads involved in a transaction, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, and the like, among other examples.

As the above examples indicate, characteristic information can include information generated by the agent itself and information generated and/or processed by the component or sub-component monitored (and collected) by the agent (such as data sent or received by the component that intercepted by one or more agents). The agent can then cause information identifying those characteristics to be provided to one or more other services or tools (e.g., of transaction analysis engine 205, etc.) communicatively coupled to the agent. In some embodiments, each instrumentation agent collects information to form a message, also referred to herein as a transaction data frame (or simply "frame"), which describes characteristics associated with both a detected request and a detected response corresponding to that request. In such embodiments, the respective agent can wait for the response corresponding to the request to be generated and sent before sending the frame to another tool or engine (e.g., 230, 232, 234, 235, 236, 238, 240, 242, 244, etc.) making use of the information in the frame. Additionally, agents can monitor and report characteristics independently for each transaction in which its respective monitored component(s) (e.g., 264, 270, etc.) participates. In addition to monitoring the performance of a component and aggregating information about that component over one or a multitude of transactions (such that information about the performance of individual transactions can, for example, be averaged or statistically assessed based upon the observed performance of the component over the course of multiple monitored transactions), agents (e.g., 260, 265) can additionally provide characteristics that are specific to and correlated with a specific transaction. More particularly, these characteristics that are monitored and reported by the agents can be specific to and correlated with a particular request and/or response generated as a part, or fragment, of a transaction.

In some embodiments, all or some of agents (e.g., 260, 265) can be configured to perform interception and/or inspection (e.g., using the Java (TM) Virtual Machine Tool Interface, or JVM TI). Such an instrumentation agent can register with the appropriate application programming agent (API) associated with the component or process being monitored in order to be notified when entry and/or exit points occur. This allows the agent to detect requests and responses, as well as the characteristics of those requests and responses. In particular, this functionality can allow an agent to detect when a component begins reading and/or writing from and/or to a socket, to track how much data is accessed (e.g., read or written), obtain a copy of the data so read or written, and generate timing information (as well as information describing any other desired characteristics such as inbound/read or outbound/write identifiers) describing the time or order at which the data was read or written, among other information describing the data accessed, processed, or generated by the component.

In some instances, agents (e.g., 260, 265) can be configured to monitor individual threads by monitoring the storage used by each thread (i.e., the thread local storage for that thread), among other information. Such agents can detect when the monitored thread begins reading or writing to a thread local variable in the thread local storage. In response to detecting this access to the thread local variable, the agent can track the amount (e.g., in bytes, as tracked by incrementing a counter) of data that has been accessed, as well as the starting offset within the thread local storage to which the access takes place. In response to detecting that the thread's access to the thread local variable has ended, the instrumentation agent can use the information about the access to identify characteristics such as the time of the access, the variable being accessed, the value being accessed, network calls being made, and the like.

As noted above, in some implementations, one of the characteristics that can be collected by agents (e.g., 260, 265) can include timing information, such as a timestamp, that indicates when a particular request was received or when a particular response was generated. Such timing information can be included in transaction data 245 and be used, for instance, by transaction path engine 230, to identify that frames, including frames received from different agents, are related to the same transaction. In some implementations, timers used by agents (e.g., 260, 265) can be synchronized to assist in correlating timing information collected between multiple agents. Additionally or alternatively, flow, organization, hierarchy, or timing of a particular transaction can be identified through the generation of transaction identifiers that include characteristics collected by agents (e.g., 260, 265) for use in identifying fragments of the transaction. Such transaction identifiers, or transaction fragment identifiers, can include data collected by instrumentation agents in connection with, for example, the exchange of data, messaging, and other communications between components in the transaction, from thread jumps identified within software processes involved in the transaction, and other features of the transaction or fragments of the transaction.

In some implementations, agents (e.g., 260, 265) can be implemented by inserting a few lines of code into the software component (or the application server associated with that software component) being instrumented. Such code can be inserted into a servlet filter, SOAP filter, a web service handler, an EJB3 method call, a call to a Java Database Connectivity (JDBC) handler, and the like. For example, an agent configured to monitor an EJB can be configured as an EJB3 entity listener (e.g., to monitor entity beans) or interceptor (e.g., to monitor session beans). Some components (or their corresponding application servers) may not provide users with the ability to modify their code, and thus some instrumentation agents can be implemented externally to the component being monitored in a manner that can cause all requests and responses being sent to and/or from that component to be handled by the corresponding agent(s). For example, for an existing database, an agent can be implemented as a driver. Calling components can be configured (e.g., by manipulating a driver manager) to call the instrumentation driver instead of the database's driver. The instrumentation driver can in turn call the database's driver and cause the database's driver to return responses to the instrumentation driver. For example, in one embodiment, the identity of the "real" driver for the database can be embedded in the uniform resource locator (URL) that is passed to the instrumentation driver. In this way, the instrumentation driver can intercept all calls to the database, detect characteristics of those calls, pass the calls to the appropriate database, detect characteristics of the corresponding responses, and then return the characteristics of those calls and responses within corresponding transaction data 245, among other examples.

As requests and responses progress through one or more systems (e.g., 215, 220, 225), additional characteristic information can be captured, for instance, as transaction data 245. For example, a test, simulation, or live operation of one or more software systems (e.g., 215, 220, 225) engaged in one or more transactions can be monitored, for instance, by one or more agents (e.g., 260, 265) and the agents can capture characteristic information associated with requests in the transaction (e.g., the time at which the request was received, the sender of that request, the time at which corresponding requests were sent to a database and/or other service, etc., how much data was exchanged, the identity of the communication channel used in the request or response, and the like) and the corresponding response, and generate transaction data 245 embodying the information. Agents, in some instances, can store at least a portion of the transaction data at the agent and can also, or alternatively, send transaction data 245 to other services and tools. In some instances, transaction data can be generated from or comprise other data generated directly at the agent and sent to the transaction analysis engine 205, among other examples.

In one implementation, a transaction path engine 230 can access and utilize transaction information in transaction data 245 to identify fragments of a transaction and organize transaction fragments and accompanying information describing characteristics of the fragment of a particular transaction into groups corresponding to a common transaction. For instance, transaction fragment characteristics can be correlated to group corresponding frames into groups of frames that describe a complete transaction. In some embodiments, in order to group frames, or otherwise identify relationships between frames or transaction fragments, transaction path engine 230 (or another tool) can sort the frames based upon particular characteristics, such as timing information associated with and/or included within those frames. After being sorted, the frames can be arranged in ascending or descending order, with respect to the timing information. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing information. In other examples, frames can be sorted, for example, based on an amount of data exchanged, the identity of a particular communication channel or network connection used, addresses of the receiving and sending components, the identification of the particular agents that provided the frames, etc.

In an additional example, frames and accompanying transaction fragments can be correlated according to the amount and type of data that was received and/or generated, as detected by the agent, as well as information identifying the components or sub-components involved in the monitored activity. For example, such identity information can include information identifying the network ports (e.g., of the requester and responder), IP addresses, network information, or other features describing the communication of a request and corresponding response between a requester and responder. This information can be used to correlate or otherwise identify relationships between two different frames that have similar timing information and data amounts, for example. Identified network connections can be mapped to a particular portion, or fragment, of a transaction, and such fragments can be grouped (e.g., using the collected network connection description data) to identify particular transactions involving multiple different software components (and network connections), among other examples.

Within a group of frames or identified transaction fragments associated with the same transaction, transaction path engine 230 can order, or stitch, the frames to define a chain or order of transaction fragments within a given transaction or set of instances of a similar transaction. The stitching of the frames can be based on determined correlations between grouped frames (e.g., to identify parent-child relationships between given frames and their corresponding transaction fragments). The stitched frames can then define a transaction flow to allow the path, or flow, of the transaction to be followed from the start of the transaction to the end of the transaction and across a chain of potentially many different software components. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated by the agents. In one embodiment, the frame identifiers can be generated from information identifying the IP address (or other addressing information) and port number used by the monitored component or sub-component, the amount of data sent or received by the monitored component during the monitored activity, and/or the instrumentation agent itself, among other information. Relationships can thereby be identified between parent frames, transaction fragments, and software components and corresponding child frames, transaction fragments, and components, to stitch these frames together, among other examples.

In addition to being able to use relationships or correlations to predict or determine a stitching or flowpath of transaction fragments, transaction path engine 230, in some instances can use the lack of correlative data reported by an agent to determine that a given frame corresponds to a transaction fragment that represents a root or leaf (e.g., beginning or end) of a particular transaction or branch of a transaction. For instance, it can be identified that no related connections (or other transaction fragments) involving a particular software component (or just a single correlation) have been identified or reported and conclude, predictively, that the lack of further connections or other reporting data relating to the component or a flow including the component indicate that the transaction terminated at the component, among other examples. Similarly, root nodes can be predictively determined based on the absence of frames documenting an inbound connection at a particular component from which other transaction fragments (and related connections) originate, among other examples.

A transaction path engine 230 can utilize and correlate transaction data 245 (or agent data upon which transaction data is based) generated in part by one or more agents (e.g., 260, 265) to determine one or more transaction flow paths. The transaction path engine 230 can generate and maintain path data 246 describing the determined flow paths involving one or more software components (e.g., 264, 270, 274, etc.) or one or more software systems or applications (e.g., 215, 220, 225). Path data 246 can be used in a variety of applications, including testing, verification, and documentation. For instance, test cases to be used to govern and verify results of a test of a piece of software can be developed, in part, from path data corresponding to the piece of software to be tested, among other uses. Further, a path analysis engine 232 can consume path data 246 to perform additional activities and services in support of tests of software systems (e.g., 215, 220, 225), such as identifying boundaries between systems (e.g., 215, 220, 225), components (e.g., 264, 270, 274), and corresponding agents (e.g., 260, 265). Additionally, path analysis engine 232 can identify particular data (e.g., as captured in transaction data 245) that is generated within transactions modeled by the path data 246 and further identify sources of the particular data as well as the path of the particular data as it traverses and is processed by other software components within a transaction before being output as a response or result of the transaction, among other examples. Path analysis engine 232 can further, in some instances, process transaction path data or other data to identify boundaries between system components and systems within a system, as well as boundaries of portions of systems monitored by a respective agent, among other examples.

Figure 6:
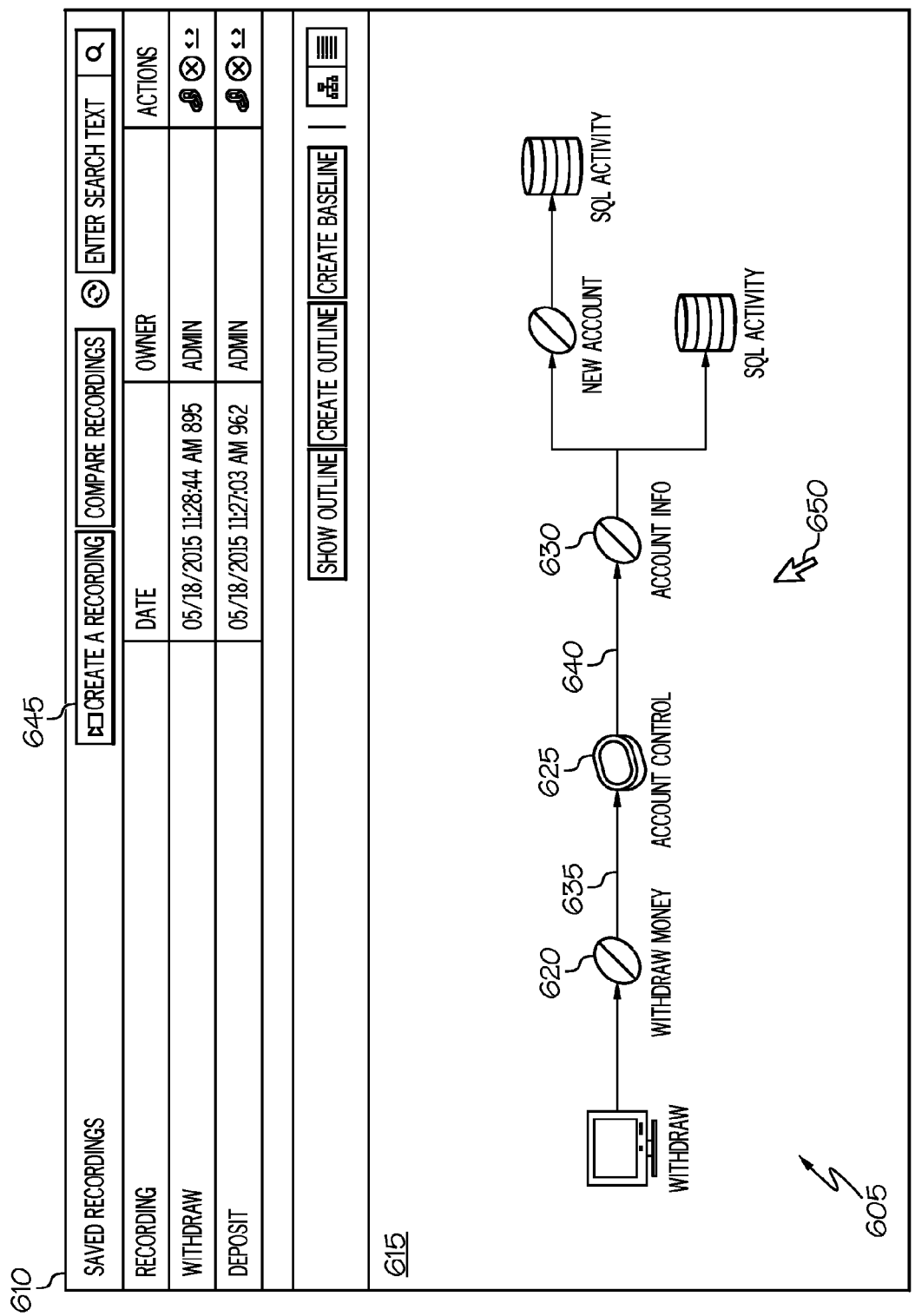
FIG. 6 is a screenshot of an example graphical user interface provided in connection with a transaction analysis system in accordance with at least one embodiment.

A GUI engine 234 can access path data 246 (and transaction data 245) and render the data to generate graphical representations (in one or more GUIs of the transaction analysis engine) of the transaction information embodied in the path and transaction data. For instance, the GUI engine 234 can be used to generate a graphical representation of the flow of a transaction. The flow can represent a single instance of an observed transaction or the aggregate of multiple observed instances of the same (or multiple different) transactions. For instance, FIG. 6 illustrates one example of a GUI that can be generated using GUI engine 234. In the example of FIG. 6, a graphical representation 605 of a transaction "withdraw" is selected (e.g., in GUI window 610) and presented within the GUI window 515. The graphical representation 605 can include graphical blocks (e.g., 620, 625, 630, etc.) representing individual software components identified as participating in the transaction. Further, graphical lines (e.g., 635, 640, etc.) can connect two of the software component representations (e.g., 620, 625, 630, etc.), with each graphical lines (e.g., 635, 640, etc.) representing an observed transaction fragment involving a request and response between the two connected software components. As an example, in FIG. 6, the graphical representation 605 can include a representation of a transaction fragment (635) that involves a request by a withdrawMoney (Java-based) software component (represented by element 620) sent to a SOAP component accountControl (represented by element 625), which then generates and send a response to the request back to the withdrawMoney element. In this example, and in connection with generating a response to the request by withdrawMoney, the accountControl component (625) can send a request to another component (e.g., AccountInfo (630)) in another transaction fragment (640), and so on (among other examples).

GUI representations of transaction flows generated by a GUI engine (e.g., 234) can be interactive. A variety of information can be collected (e.g., from agents) during monitoring of transactions, including characteristics of each transaction fragment and characteristics of the software components as they are engaged in the transaction. Each of the graphical elements e.g., 620, 625, 630, 635, 640, etc.) included in the representation 605 can be interactive, allowing users to select one or more of the elements to inspect more detailed information concerning the selected software component(s) and/or transaction fragment(s). For instance, selection of a given transaction fragment element (e.g., 635) can cause the GUI to present details concerning the selected transaction fragment including the request(s) and response(s) of the fragment, values and characteristics of the request/response, the response time, the amount of data transmitted in the request and response, the type of data sent in the request and response, the type of transport mechanism used to communicate the request and response, exceptions, logged events, and other data generated in connection with the fragment, among other example characteristics. Further, selection of a given graphical representation of a software component (e.g., 620, 625, 630) can cause the GUI to display information concerning the software component including its name, type, host system, port and socket information, header information, session IDs, local and remote IP address of the component in the transaction, thread information of the component, parent IDs, supported communication protocols, the amount of memory or processing capacity used by the software component in transaction fragments participated in by the software component, exception dumps, among other example characteristics.

Returning to the example of FIG. 2, transaction analysis engine 205 can include additional logic such as a tagging manager 235 235 to enable user tagging of portions of graphical representations of transaction flows as generated using transaction path engine 230 and GUI engine 234. A user can select individual graphical elements making up the representation of the flow and assigned a tag to the element. The tag can thereby be associated with corresponding transaction data on which the transaction flow is based, as well as the transaction fragment and/or software component(s) associated with the graphical elements tagged by the user. A variety of tags can be defined by a variety of users and can be described or embodied in tag data 248. Tags can be associated with individual users, such that when the user (and any other authorized users) views the graphical transaction flow representation having the tag, the tag appears within the graphical representation. The tag can be private to the author such that when other users view the same graphical transaction flow representation, the tag is not included. Tags can include additional information, such as user-entered notes (e.g., explaining the reason for the tag), links to view corresponding transaction frames, links to debug or test results, links to the underlying source code (e.g., of the software components responsible for the tagged transaction fragment), among other information. The tags placed by a user can remain private to the user or can be shared with other users. Tags, when represented graphically with the corresponding portion of the graphical transaction flow diagram can assist users in quickly identifying particular transactions, fragments, and software components of interest represented in what can be a large and complicated flow diagram, among other example advantages.

A transaction analysis engine 205 can also include a timing detection engine 236. As noted above, agents (e.g., 260, 265) can capture a variety of attributes of transactions and participating software components during monitoring of the system. Such attributes can include the time taken by a software component to complete each individual transaction fragment (e.g., the generation and sending of the individual requests or responses within a transaction fragment), as well as other information relating to the performance of the software components within the transactions (e.g., processor usage, bandwidth usage, memory usage, etc.). Timing detection engine 236 can mine transaction data 245 for timing characteristics (e.g., duration of time detected for completing transaction fragment portions) and other attributes. Timing detection engine 236 can interoperate (or be incorporated in) GUI engine 234 in some implementation to allow users to optionally cause graphical transaction flow diagrams to be augmented or formatted based on the timing and performance attributes captured in transaction data 245. For instance, elements representing flow from one software component to another in the graphical transaction flow diagram can be color-coded to show how quickly a given transaction fragment was completed within an overall transaction or set of transactions. In some cases, relative performance of the transaction fragment can be illustrated graphically using the timing information. For instance, portions of graphical transaction flow diagram can be color-coded to reflect which portions of the transaction(s) performed more or less quickly or optimally than average. In other cases, the color-coding can reflect how each fragment or software components in a given recorded transaction performed relative to historical performance (captured in other, earlier recorded transaction data) of the transaction fragments and software components, among other example.

In addition to presenting a representation of transaction flows to reflect certain timing and other performance parameters observed in the transaction(s), the transaction analysis engine 205 can generate graphical transaction flow diagram that reflect the amount of transaction traffic. Transaction traffic can refer to the volume or number of times a given transaction, branch in a transaction flow, or transaction fragment is observed (e.g., by agents 260, 265) during the monitoring of system transactions over a window of time. For instance, a test can cause the software system to perform a particular transaction type a number of times, resulting in a set of instances of the transaction type being performed. Depending on the inputs provided within each transaction instance (and the performance of the software components involved in the transaction), the flow of the resulting transaction instances may vary. Accordingly, graphical transaction flow diagrams may be able to be generated for each observed transaction instance, with some of the graphical transaction flow diagrams differing from other despite the transactions being instances of the same transaction type. A system may support multiple different transaction types. Accordingly, during monitoring of the system (e.g., using agents 260, 265) transaction instances of differing transaction types may be observed. In some cases, one or more software components of the system may be utilized in two or more different transaction types, and one or more transaction flows of different types may include one or more overlapping transaction fragment types, creating overlaps in the transactions of different types within the system.

In some instances, each graphical transaction flow diagram for each of the observed transaction instances can be displayed individually (e.g., in separate or the same GUI window). Alternatively, overlaps between the transaction flows can be illustrated by generating an aggregate graphical transaction flow diagram to show overlaps between the transactions, such as shown and described in U.S. patent application Ser. No. 14/853,928, entitled "Visualization of Transaction Overlaps" filed Sep. 14, 2015 and incorporated by reference herein. Additionally or alternatively, a single graphical transaction flow diagram can be presented to illustrate the potential flows of a single transaction type. For instance, the graphical transaction flow diagram can illustrate each of the possible flows of a single transaction type as they branch off along alternative flow paths at one or more nodes of the transactions. Additionally, a set of one or more graphical transaction flow diagrams for a set of transaction types supported by a system can be displayed together. As some of the transactions and transaction fragments may be observed at a higher frequency than others in the monitoring of the system, the respective graphical transaction flow diagrams can be formatted to show (to the user) which transaction fragments occurred at a higher frequency (based on the flows determined for the various transaction instances observed during the monitoring). The respective volumes of transaction fragments can be determined, for instance, using traffic detection engine 238, which can interoperate with GUI engine 234 to cause the relative volumes to be presented within the respective graphical transaction flow diagrams generated for the transactions.

Throughout a system's lifecycle, various functionality and components of the system can be modified. Such changes can affect the universe of transactions supported by the system, the ways in which the transactions flow, and the performance of the system. Graphical transaction flow diagrams generated for the transactions can be formatted to reflect at least some of these characteristics. For instance, transaction data 245 can include historical transaction data from a recording of a system's transactions at an earlier point in time. A new or later-performed recording (or monitoring session) can be performed, with the resulting transaction data being used to determine that the transaction flows observed during the later recording differ from the transaction flows observed for the same system during the earlier recording. Accordingly, a delta can be determined between the flows, for instance, using differential detection engine 240. The delta can identify differences in the software components used by the system during each monitoring, the differences between the transactions and transaction fragments detected during each respective monitoring, performance characteristics of the participating software components and/or transactions, among other differences. The differences can be quantified and converted into graphical representations that can be overlaid or incorporated within the corresponding graphical transaction flow diagrams. In some instances, the differences can highlighted by formatting certain graphical elements in the diagrams, such as the block elements representing software components or connector elements representing transaction fragments where the corresponding difference, or delta value, was detected. In some implementations, two or more graphical transaction flow diagrams from transaction monitoring during two or more different time windows can be presented together in the same GUI (in the same or different GUI windows) to further illustrate the nature of the detected differences, among other information and features.

In some implementations, a virtualization system 210 can be provided that interoperates with transaction analysis engine 205. A virtualization system 210 can include one or more processor devices 252, memory devices 254, and other hardware and software components including, for instance, a virtual service generator 255, virtual environment 258 for provisioning and executing virtual services, among other examples. A virtualization system 210 can be used to generate and manage virtual services (e.g., 256) that model software components and systems. Such virtual services 256 can be used as stand-ins in tests involving the real-world systems modeled by the virtual service. The GUIs provided through transaction analysis engine 205 can assist users in determining which components to virtualize. For instance, tags, transaction traffic, transaction duration, and/or transaction differentials (e.g., as represented in the graphical representations of transaction flows determined by the transaction analysis engine 205, can be used to identify problem software components and/or transaction fragments, particular important or well-used components and transactions, etc., forming the basis for virtualizing corresponding software components, among other examples. In any case, virtual services 256 can be generated by virtualization system 210 (e.g., using virtual service generator 255) based on detected requests and responses exchanged between two or more software components or systems. Such request and response information can be captured, for instance, by agents (e.g., 260, 265) capable of monitoring a software component that is to be virtualized or that interacts with another software component to be virtualized, among other examples. Virtual services can capture and simulate the behavior, data and performance characteristics of complete composite application environments, making them available for development and testing at the request of a user or system and throughout the software lifecycle, among other advantages.

A virtualization system 210 can include functionality for the creation of complete software-based environments that simulate observed behaviors, stateful transactions and performance scenarios implemented by one or more software components or applications. Such virtual services provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services can be invoked and executed in a virtual environment 258 implemented, for instance, within on-premise computing environments, in private and public cloud-based lab, using virtual machines, traditional operating systems, and other environments, among other examples. In some implementations, virtualization system 210 and virtual services 256 can utilize or adopt principled described, for example, in U.S. patent application Ser. No. 13/341,650 entitled "Service Modeling and Virtualization," incorporated herein by reference in its entirety as if completely and fully set forth herein.

In implementations utilizing one or more agent managers (e.g., 244), multiple agents (e.g., 260, 265) can communicate with single agent manager 244 via a messaging system. In some cases, agents monitoring components hosted on distinct, or remote, devices can communicate over one or more networks with one or more centralized, or semi-centralized, agent managers 244. In one example implementation, agents (e.g., 260, 265) can communicate with an agent manager 244 using a messaging system such as Java (™) Message Service (JMS), among other examples. For instance, agent manager 244 can create a messaging system topic for each transaction (referred to herein as a transaction frame (TF) topic) and subscribe to that TF topic. The instrumentation agents, upon startup, can broadcast their existence to each other and/or to agent manager 244. The agents (e.g., 260, 265) can then get the TF topic from agent manager 244 and begin publishing messages onto a message bus on that TF topic. Agent manager 244 can monitor the published messages and determine whether those messages relate to the current TF topic. As needed, agent manager 244 creates new TF topics for new transactions. In other examples, agents (e.g., 260, 265) can alternatively communicate with agent manager 244 using techniques other than those involving messaging systems. For example, agents can write information to shared data repository (e.g., a database associated with the test system) using database commands, and an agent manager 242 can monitor those database commands to detect new information, among other examples.

Software components (e.g., 264, 270, 274) can be hosted by one or more applications, services, or programs (e.g., 215, 220, 225). These programs and software components can be hosted on a single or multiple different computing device(s). In some cases, the software components can communicate with other software components hosted by remote servers over one or more networks (e.g., 140).

Accordingly, application servers and their software programs can incorporate interfaces (e.g., 262, 266, 272) through which the software programs (and their components) can communicate and interoperate. Further, in some examples, such as front end or customer-facing programs and services (e.g., 220) one or more user interfaces (e.g., GUIs) 268 can be provided, among other features and components.

Figure 3:
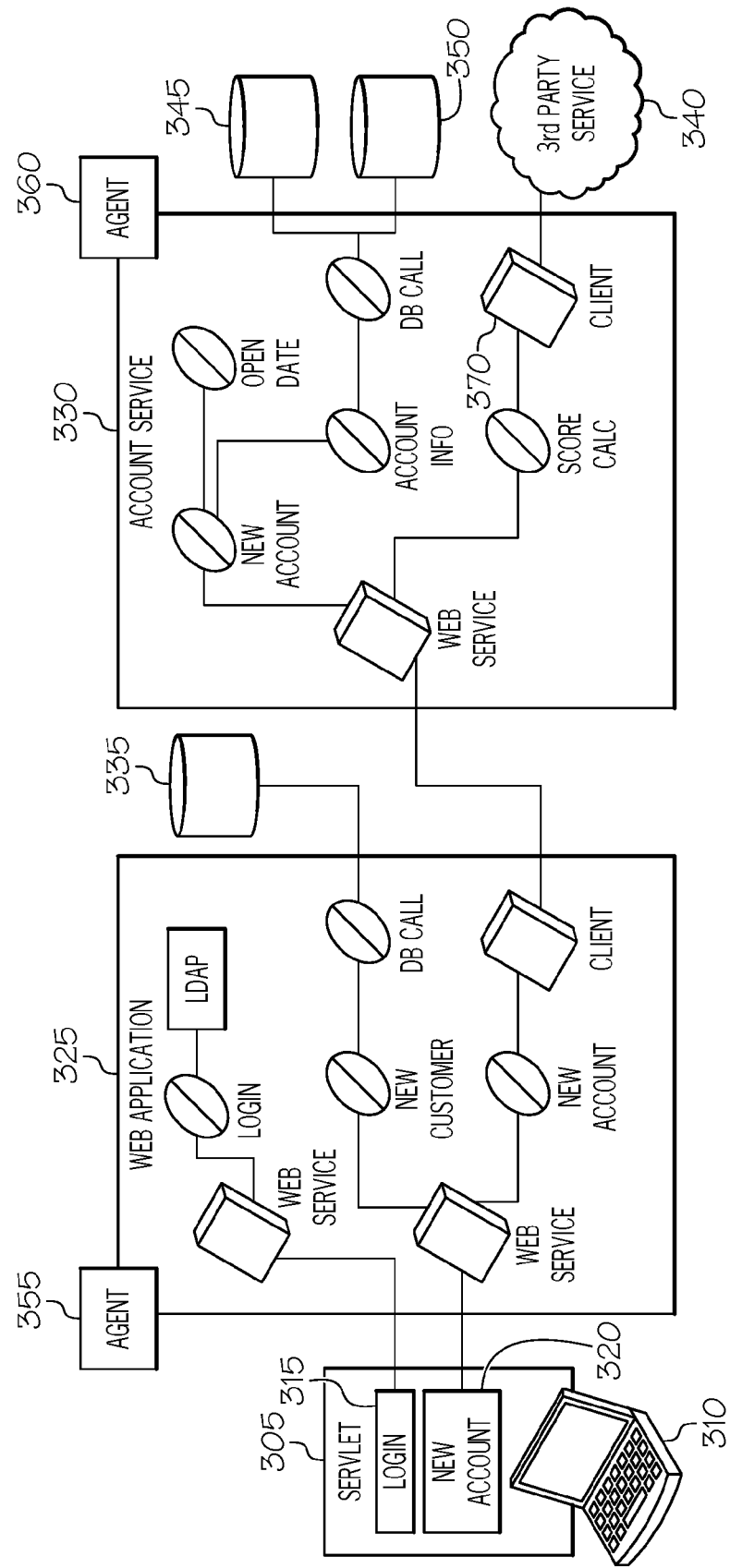
FIG. 3 is a simplified block diagram of an example system to perform one or more transactions in accordance with at least one embodiment.

Turning to FIG. 3, a simplified block diagram is shown representing example software systems and components capable of engaging in one or more transactions (e.g., illustrated in FIGS. 4A-4F) that can be monitored and modeled using the example systems and techniques disclosed herein. It should be appreciated that the example systems and transactions shown here are presented for illustrating certain general features and principles and are provided as non-limiting, simplified examples. Indeed, the features and principles discussed herein have application to a potentially limitless array of real-world systems and transactions (e.g., different from those illustrated in FIGS. 3-4F) that can likewise be monitored, analyzed, and tested in accordance with the principled outlined herein.

Figure 4A:
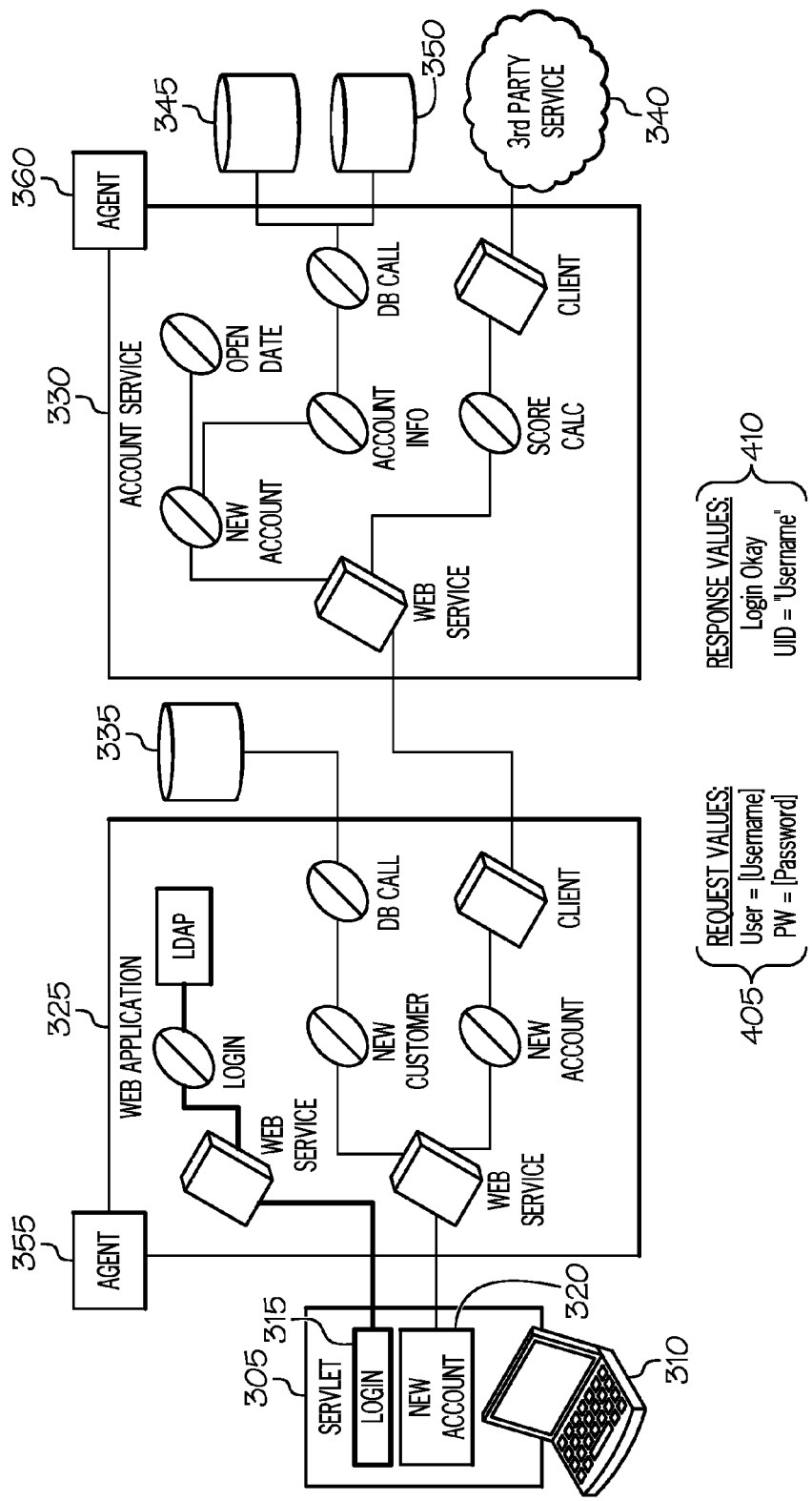

In the particular example of FIG. 3, a servlet component 305 is provided as a front end for an example Login transaction 315 and New Account transaction 320 accessible to users of user computer devices (e.g., 310). The Login transaction can involve calling a web service of a web application 325 and use of a Login software component (e.g., implemented in this particular example as JavaBean software components) and Lightweight Directory Access Protocol (LDAP) system to facilitate the logging-in of a user into an account of the web application 325. FIG. 4A illustrates the flow path of the example Login transaction 315 as well as example request values 405 of the Login transaction together with example response values 410 returned in the transaction in response to the request values 405. For instance, Login transaction can include a user-provided username and password pair (provided through servlet 305) resulting in a Login Okay response value when the provided username-password pair matches the username-password pair of an existing account managed by the LDAP system of web application 325. Further, the identity of the username can also be returned, for instance, in a welcome message identifying the username.

Figure 4B:
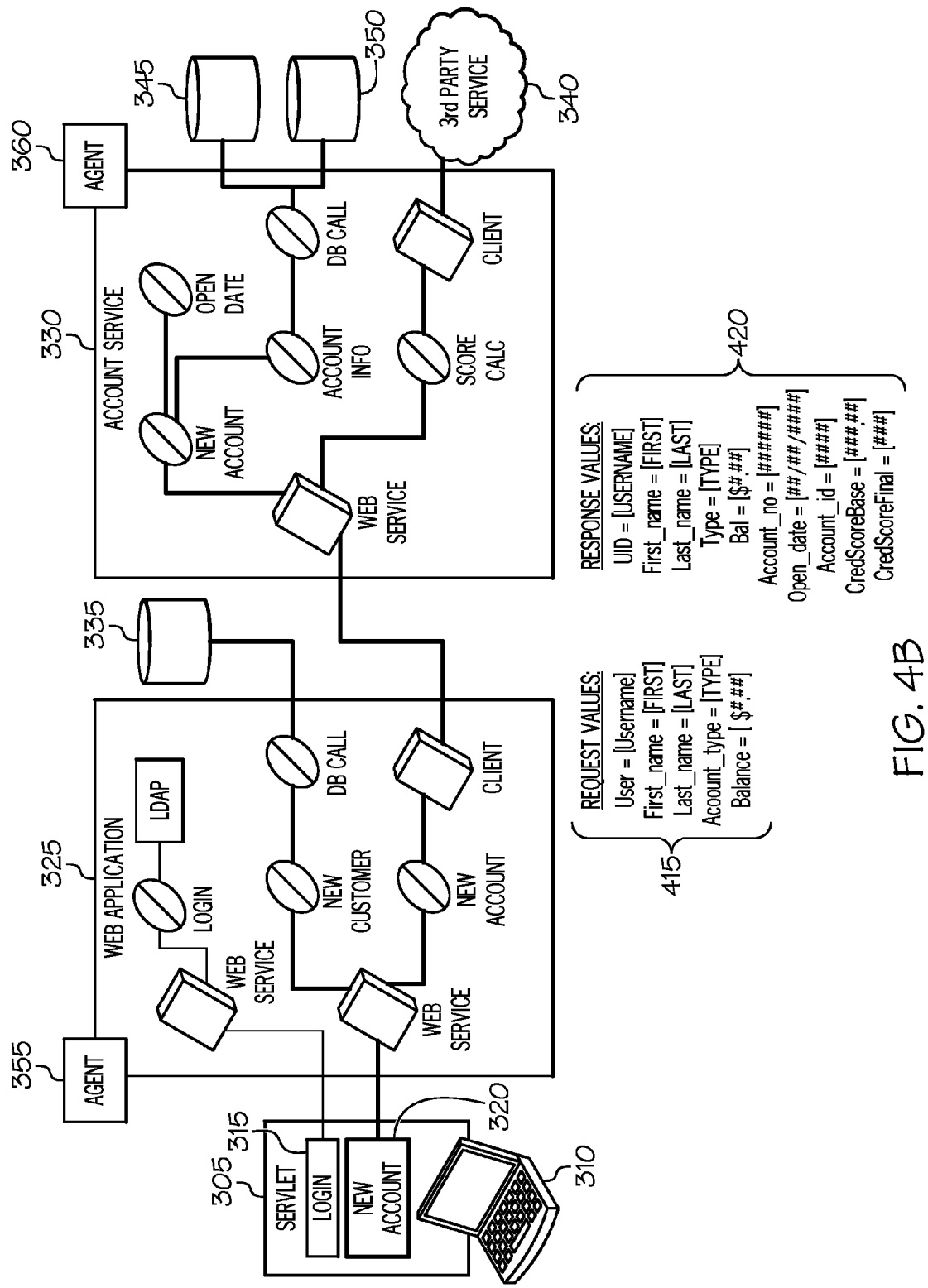

Returning to FIG. 3, additional transactions can be provided and identified. For instance, the New Account transaction 325 can support the creation and storage of a new account, such as an account for an ecommerce, banking, media subscription, or other application or service. For instance, as shown in the example of FIG. 4B, a more complex flow path can be identified for the New Account transaction 325 including multiple branches in the flow path. For example, upon creation of a new account (using New Account transaction 325) corresponding account information can be entered into a database 335 maintained outside of web application 325 and account service 330. The account information can be generated by one or more software components, such as by software components of account service 330, database 345, third party service 340, or other services and entities. New Account transaction can accept inputs or request values 415, such as username, first name, last name, account type, and account balance (e.g., for a loan, bank, e-payment, or other financial account). These request values 415, when processed in the transaction, can cause the retrieval, generation, and return of response values 420 including response values (such as values corresponding to user ID, first name, last name, account type, and balance) that are at least partially dependent or predictable based on values of the request values 415, as well as additional response values (such as values of an account number, account open date, account ID, credit score, etc.) that are not derived from or based on any of the request values 415.

The flow paths of each respective transaction involving a particular software component or system can be represented in transaction path data generated, for instance, using a transaction path engine. Transaction path data can be generated by grouping and correlating transaction fragment information included in transaction data 245 embodying information captured and generated by one or more agents 355, 360 deployed on the software components and/or systems involved in the transactions, as illustrated in the example of FIG. 3. Some software components, such as third party service 340, may be unmanaged in that they are not instrumented with agents under the control of or otherwise accessible to a transaction path engine, test engine, or other tool or entity monitoring the transaction. The involvement and functionality of such unmanaged software components may remain unknown to the tools utilized in the development of transaction paths and tests of a particular transaction, and can be effectively regarded as a black box within the transaction that accepts certain monitored requests and returns corresponding responses captured, in some instances, by the agent (e.g., 360) of a neighboring monitored software component (e.g., SOAP client 370) receiving the response value from the unmonitored component (e.g., third party service 340), among other examples.

Figure 4C:
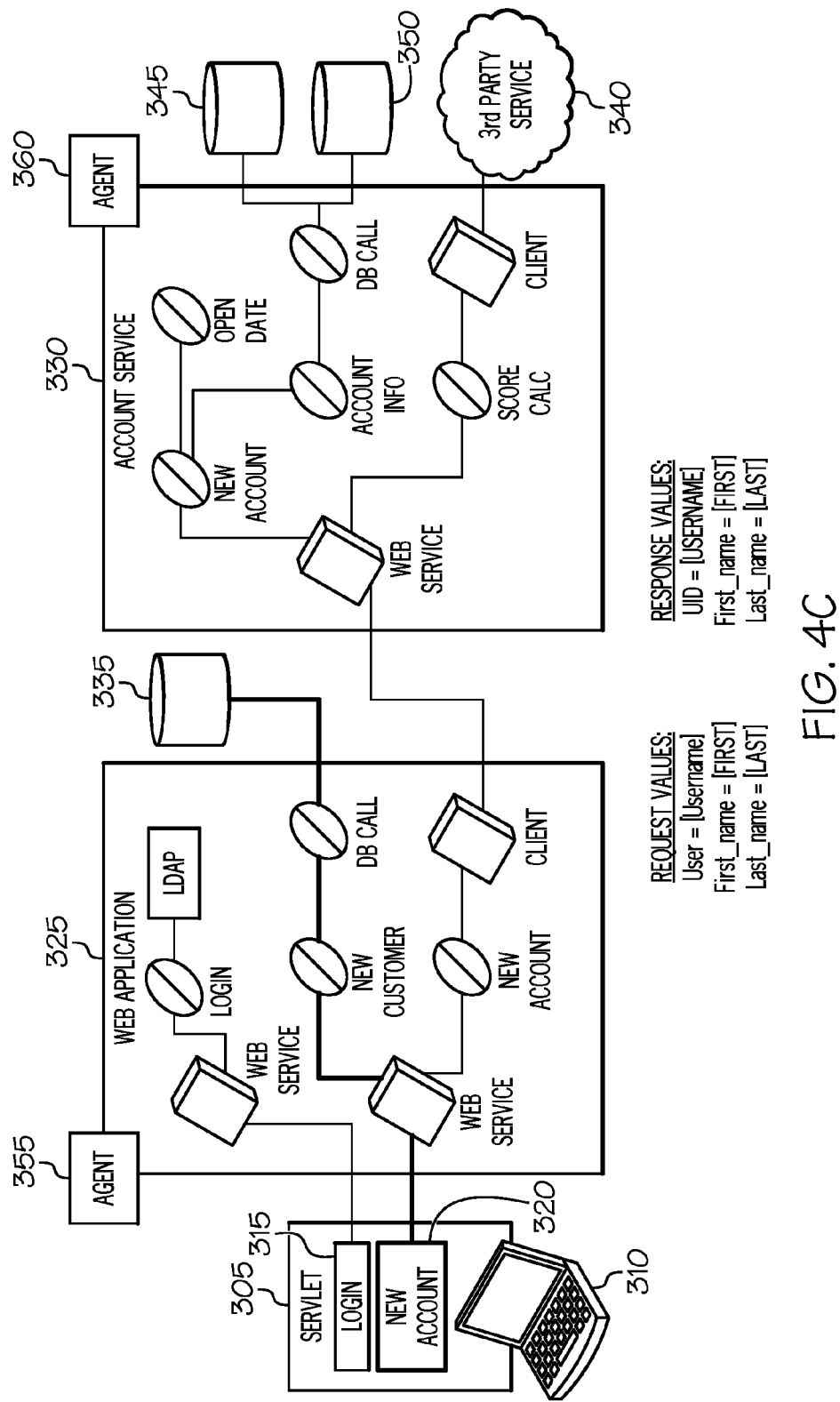

In some implementations, a single transaction can include the generation, communication, and use of multiple different response values. The generation and processing of various data within a transaction can involve the transmission of request values and response values to multiple different software components along multiple different sub-paths, or branches, of the transaction flow path. For example, FIG. 4C shows an example of a first branch of a transaction flow path shown bolded in FIG. 4B. The flow path branch of FIG. 4C shows a path for generating and storing a response value in database 335. For example, a response value can be generated or communicated by a New Customer software component for a new customer record utilizing other account information generated in the transaction. Response values such as UID, First_name, and Last_name may be provided from or generated by a New Customer software component or from a database call of database 335, among other examples. The actual values of UID, First_name, and Last_name, in some examples, can be obtained from request values provided by a user, such as the request values User, First_name, and Last_name. In some examples, proper operation of the New Customer software component may be evidenced by the generation of response values UID, First_name, and Last_name that echo request values User, First_name, and Last_name, among other examples.

FIG. 4D illustrates another branch of an example New Account transaction, such as the New Account transaction introduced in the example of FIG. 4B. An account open date (e.g., Open_date) can be one of the response values returned in connection with the New Account transaction. In one example, an Open Date software component can include the logic for generating an account open date to be associated with a record to be provided to database 335 corresponding to the opening of the new account in connection with the New Account transaction. The account Open_date value can be generated by the Open Date component in response to a call from a New Account component of account service 330. The New Account component can additionally manage the generation of additional account data, such as by the Account Info component. The New Account component can be called through a web service call (such as a SOAP call) from web application 325 to account service 330 triggered by a New Account component at web application 325. Accordingly, as shown in the example of FIG. 4D, the invocation of an Open Date software component object can be triggered through a series of calls originating at servlet 305 and the response value Open_date can be generated and passed back from the Open Date component as a response over the same transaction flow path branch to be returned to servlet 305. The value of Open_date can be passed and reappear at each of the components upstream (i.e., in the direction of the flow path toward the software component originating the transaction request (e.g., servlet 305)). The Open Date software component can be identified as the source of the Open_date response value based on an identification of the Open Date component as a leaf in the transaction flow path branch corresponding to the Open_date response value. The Open Date software component can be identified as the leaf of the transaction flow path branch based on, for example, transaction data illustrating that the Open Date software component has no children components but is, instead, only a child component of other components with respect to the Open_date response value and the corresponding transaction path branch, among other examples.

Figure 4E:
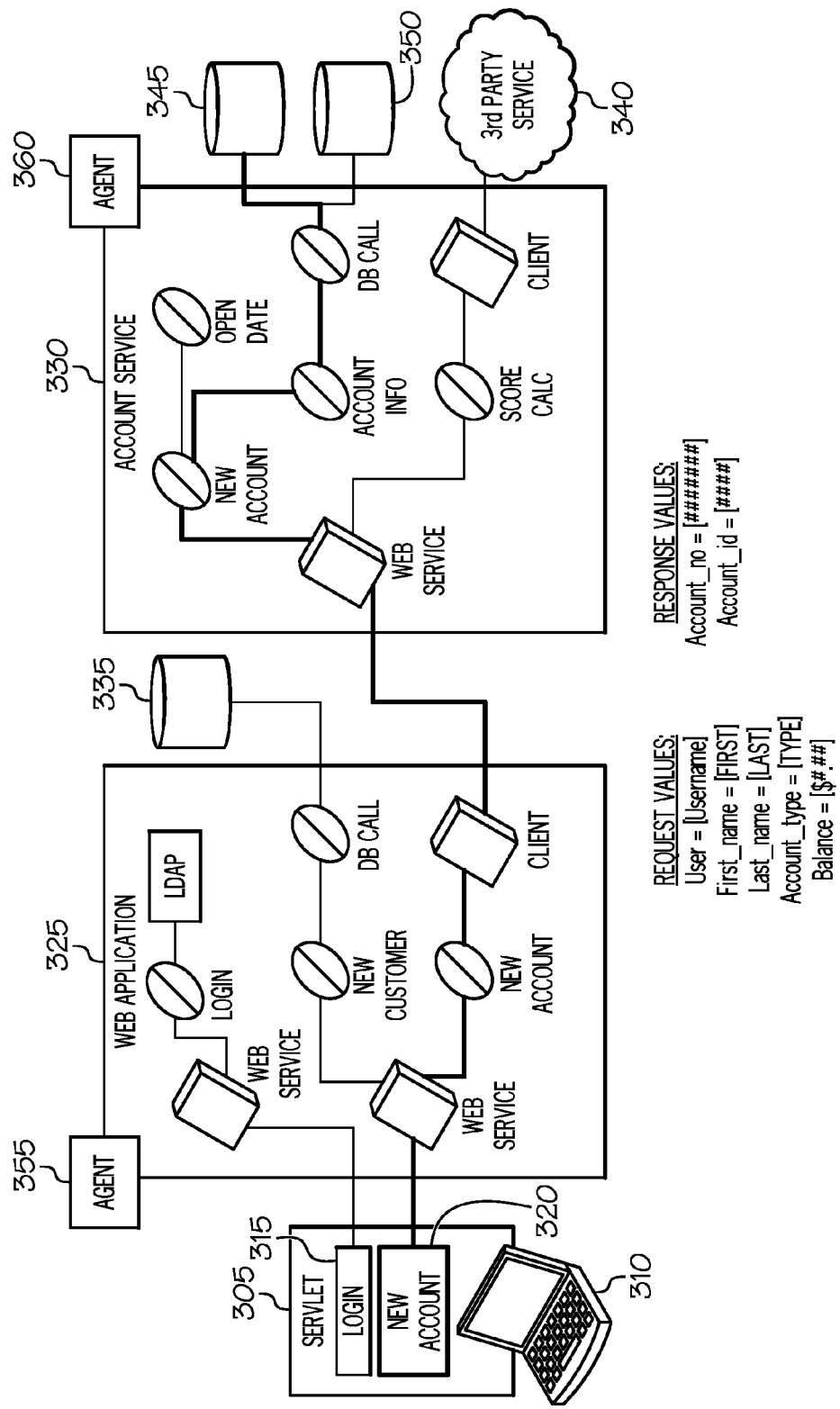

The example of FIG. 4E illustrates another example transaction flow path branch, in this case, relating to the chain of requests resulting in the generation of response values Account_no (e.g., providing the new account number generated for the account) and Account_id (e.g., corresponding to a database record for the new account), generated, for instance, by an unmonitored software component, such as database 345 or other data store, external to monitored software systems 325, 330, among other examples. The values of Account_no and Account_id, as with Open_date, may be independent of the request values provided in the transaction and involve calls by software components across application boundaries and networks connecting two disparate applications (e.g., 325, 330). For instance, the New Account software component of web application 325 may call the New Account software object of account service 330 using a web service call. An Account Info software component of account service 330 may in turn be called to generate values for the new account. For example, a database component 345 may include logic for auto-incrementing account number values (e.g., Account_no) for each new record that is added to the database 345. It can be identified that a database call was made to database 345 and that such a database call is a leaf of the transaction path branch. Further, it can be identified that the database 345 is the source of a particular value, such as in the example of FIG. 4E. Although the database 345 is not monitored by an agent, in some implementations, a transaction path engine or other tool can recognize certain types of calls to external components, such as SQL database calls, inverted list database calls, virtual storage access method (VSAM) calls, indexed sequential access method (ISAM) calls, flat file queries, and cache database calls, among other examples. Through such types of calls, the transaction path engine can make certain assumptions about the nature and operation of the external component. For instance, in the example of FIG. 4E, in instances of a SQL call to component 345, the SQL call can be identified, by an agent 350, and interpreted to conclude that component 345 is a database and the source of the value returned in response to the SQL call, among other examples. For instance, other types of calls can be used to implicitly identify the general character of a software component generating or returning a particular value in a transaction.

Figure 4F:
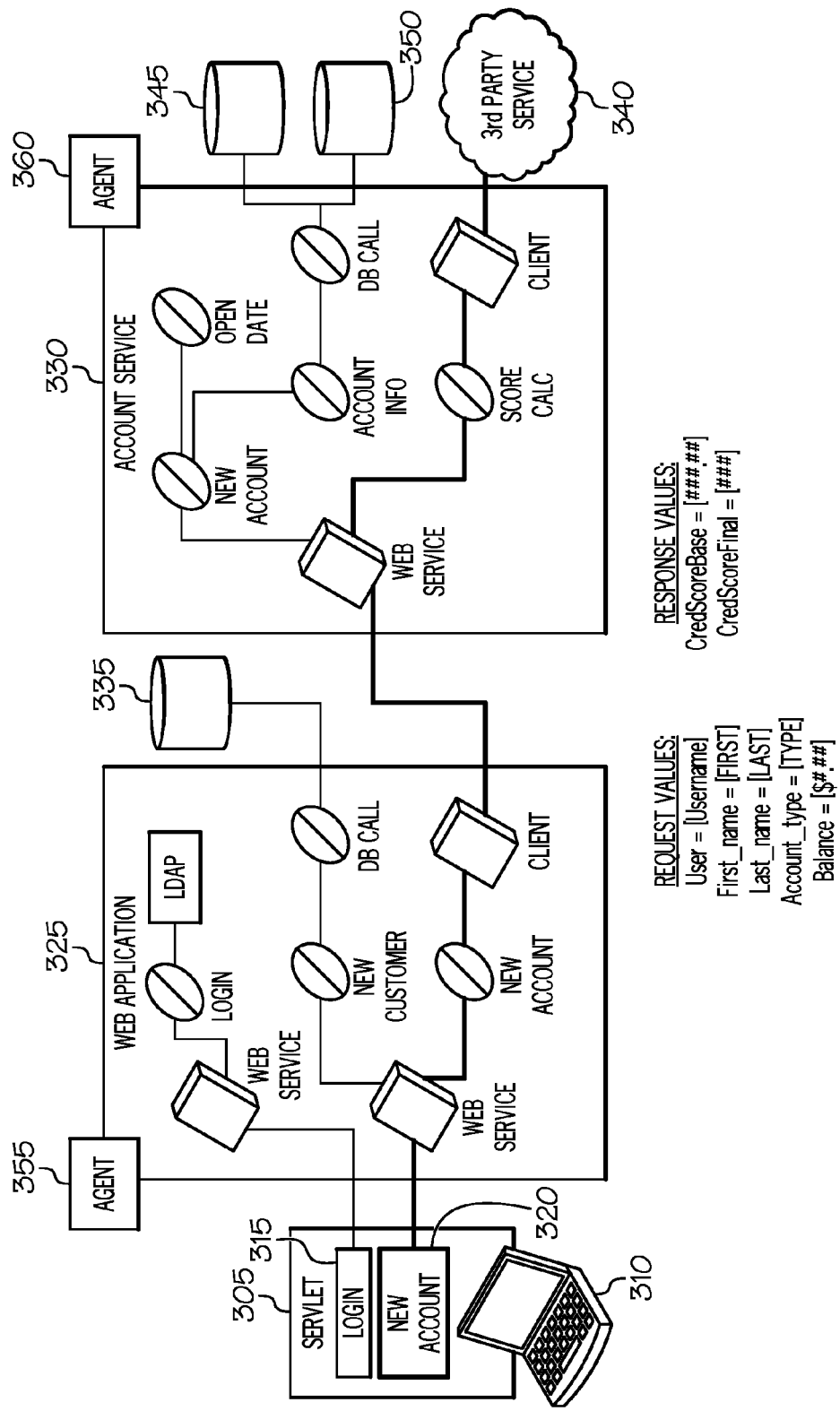

FIG. 4F illustrates another example transaction path branch involving a call to an unmonitored third party service 340. Transaction data collected or generated by agents 355, 360 can be processed to create transaction path data that can be analyzed to identify that a CredScoreBase value is returned from a third party service 340 and that the CredScoreBase value is utilized by a Score Calc software component to generate a CredScoreFinal value. Accordingly, an analysis of the corresponding transaction path data can result in the identification of the third party service 340 as the source of the CredScoreBase value and the Score Calc component of the account service 330 as the source of the CredScoreFinal value. As the third party service 340, in this example, is unmanaged, agents 355, 360 used to monitor the transaction are left without intelligence regarding how the CredScoreBase value is generated within the third party service 340, whether other external services are called in connection with the generation of the CredScoreBase value by the third party service 340, and so on. On the other hand, the agent 360 monitoring Score Calc component can identify with precision that the CredScoreFinal value was generated by the Score Calc component based on a CredScoreBase value returned from the unknown third party service 340. Further, agent 360 can capture the value returned by third party service 340 through monitoring of web service client 370, Score Calc component, etc.

Figure 5:
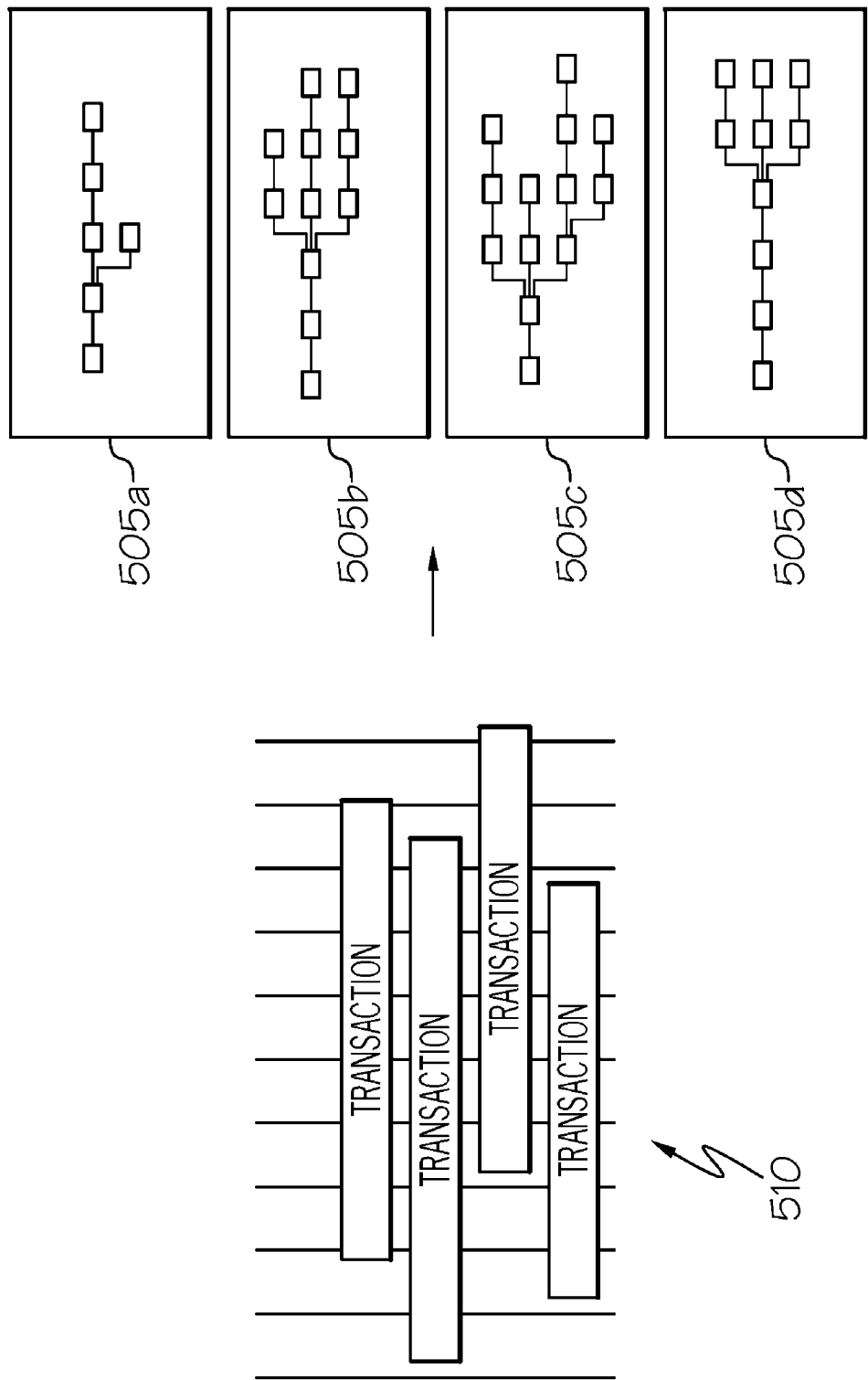
FIG. 5 is a simplified block diagram illustrating an example determination of transaction flows in accordance with at least one embodiment.

Turning to FIG. 5, a simplified block diagram is shown illustrating the generation of transaction path data (e.g., 505*a-d*) for each of multiple transactions 510 monitored by one or more agents of a transaction analysis system. As represented in FIG. 5, a system can be engaged in multiple distinct transactions during a single period of time t. The transactions can be transactions occurring within live production operation of the system and/or test transactions (e.g., with a live or test deployment of the system). Further, some of the transactions can be instances of the same transaction type (e.g., different instances of the same login, withdraw, account creation transaction, etc.) or instances of different transaction types that nonetheless use the same software system (and even common software components within the software system). Monitoring of these concurrent transactions can also take place concurrently and transaction data generated from this monitoring can be deposited in memory of the transaction analysis system. The transaction analysis system and/or cooperating agents can then generate path data 505*a-d* for each of the monitored transactions 510. Additionally, corresponding graphical representations of each of the flows described in the path data 505*a-d* can be made available for rendering in a GUI. In some cases, a single flow diagram can be generated for transaction data from multiple transactions. For instance, transactions that potentially involve multiple different alternative branches can be modeled by observing multiple instances of the transactions such that the flow of each alternative branch is observed. The transaction data from these transactions can be aggregated to define a flow that considers each of the alternative branches and a corresponding graphical representation can be presented showing the flow within each alternative branch. Aggregation of the determined data flows can also be utilized to generate a graphical representation that summarizes a plurality of different transactions that can be supported by a single system or portion of the system. Such a collection of transactions and the resulting graphical diagram can represent all or a portion of the overall architecture of the corresponding system.

FIG. 6 screenshots 600 of at least a portion of an example GUI 605 that can be presented in connection with the analysis of a transaction path. A graphical representation (e.g., 605) of a transaction path can be generated from a previously monitored, or recorded, transaction (e.g., by selecting from saved recordings in window 610). In other instances, a graphical representation 605 of a transaction path can be generated in response to a newly launched and monitored transaction. For instance, by selecting controls (e.g., 645) provided in the GUI, a new recording can be made. Creating a recording can involve selecting a known transaction capable of being performed by a particular system or by selecting to record all transaction of the particular system (or a selected portion of the particular system) during a period of time. Launching one or more transactions or passively recording operation of the system can result in the generation of new transaction data describing interactions of the software components engaged during the recording, or monitoring, session. Corresponding transaction path (and overlap) data can be generated from the recordings. Further, in response to either the selection of a saved recording (e.g., through interaction with window 610 using a cursor (e.g., 650)) or creation of a new recording (e.g., through control 645), any transaction flows determined from the recordings can be automatically output as graphical flow representations (e.g., 605) presented to the user in the GUI (e.g., in window 615). While the example of FIG. 6 shows a graphical representation 605 of a single transaction, potentially multiple graphical representations can be presented in the window 615 in response to a request. For instance, a request to record general operation of a software system (or traffic on one or more sockets of the software system) can result in the recording of multiple transactions leading to the automatic generation of multiple transaction flow representations within the GUI.

Figure 7A:
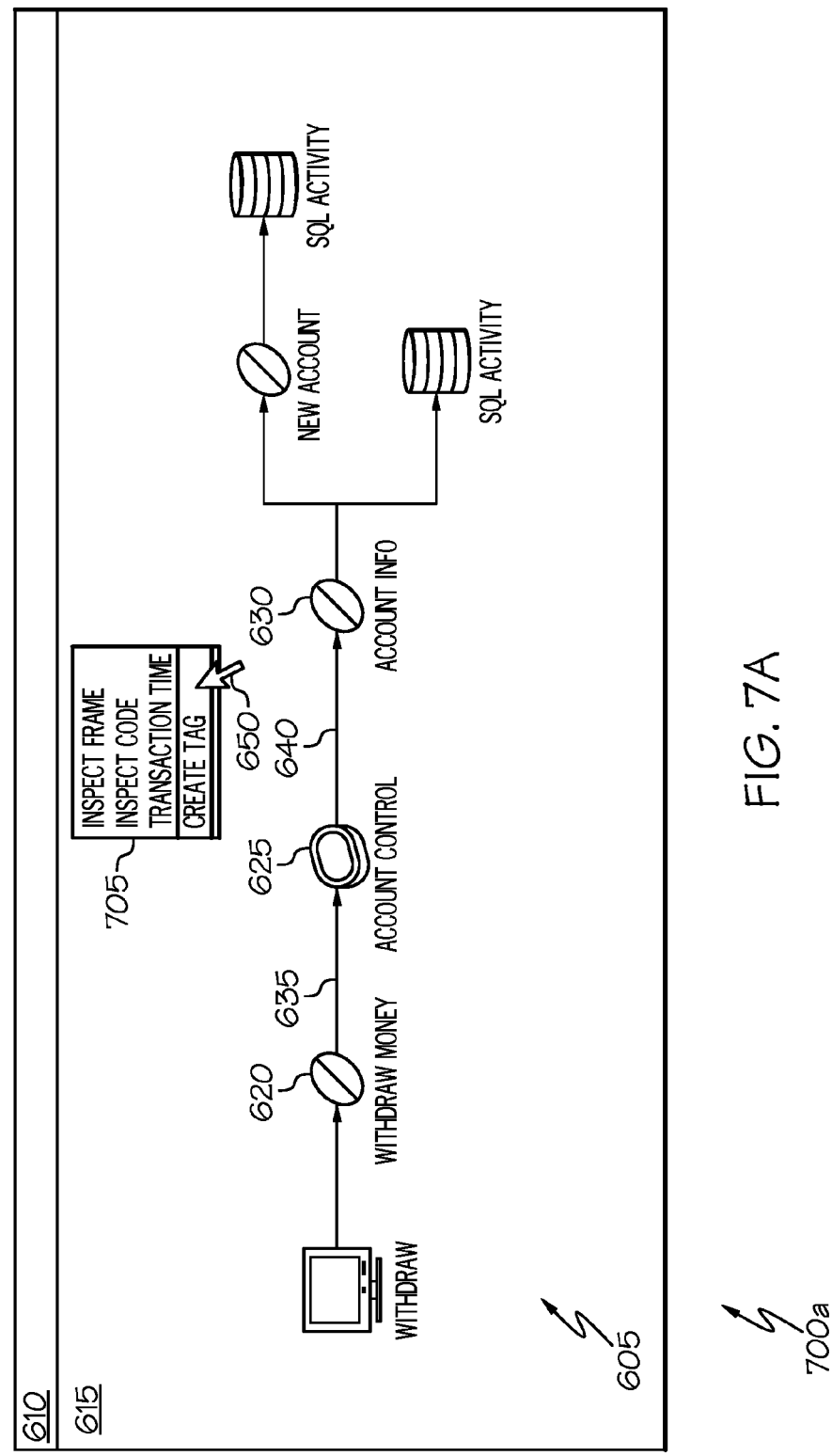
FIGS. 7A-7B are screenshots of example graphical user interfaces provided in connection with a tagging functions supported by a transaction analysis system in accordance with at least one embodiment.
Figure 7B:
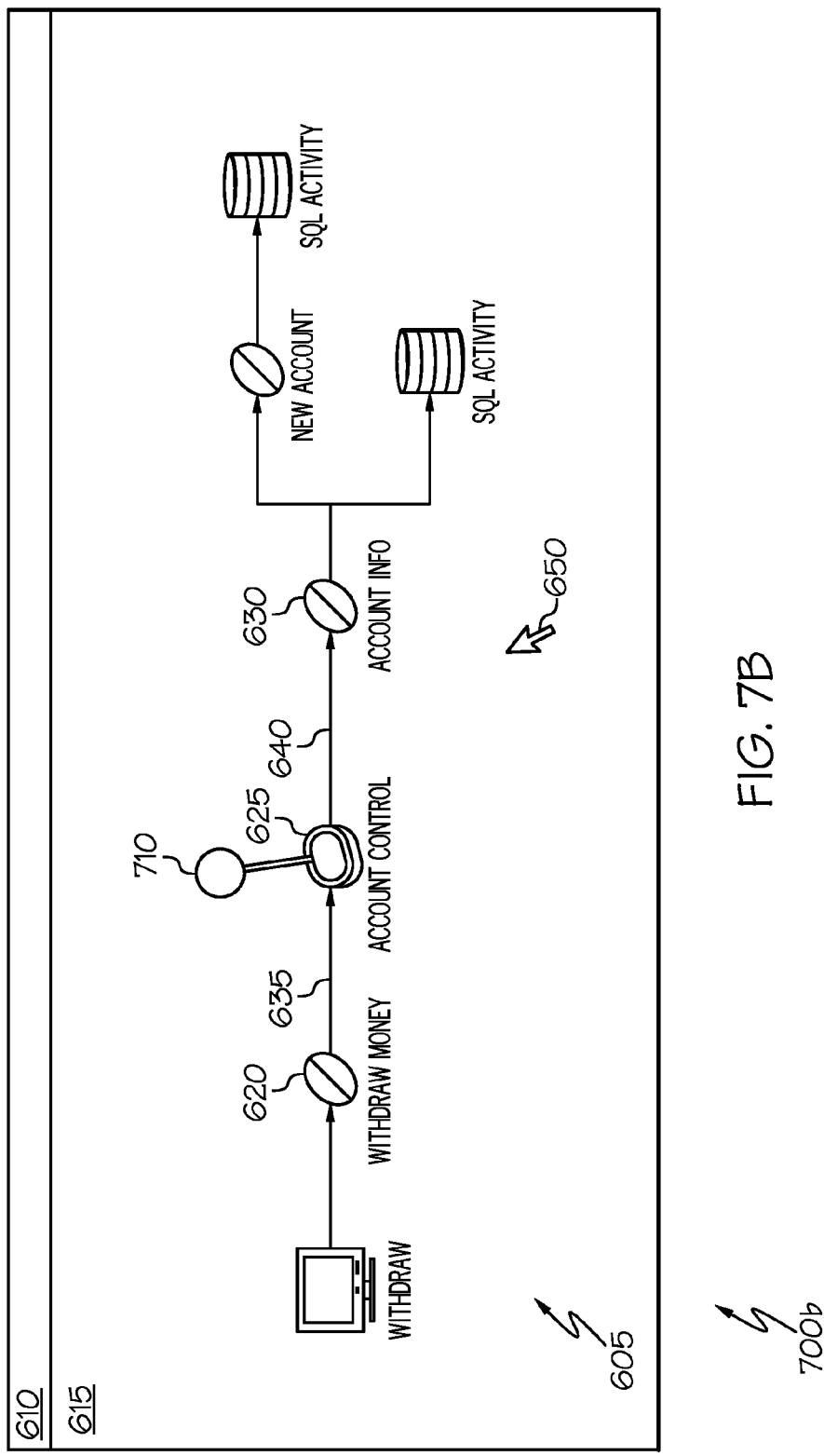

Turning to FIGS. 7A-7B, screenshots 700a-b are shown of example GUIs of a transaction analysis system incorporating functionality supporting user tagging of portions of the transaction lows represented in the graphical transaction flow diagrams (e.g., 605). As noted above, graphical transaction flow diagrams (e.g., 605) (along with other portions of GUIs of a transaction analysis system) can be interactive. For instance, users can interact with one or more graphical elements (e.g., 620, 625, 630, 635, 640, etc.) included in the graphical transaction flow diagram. Tasks related to the monitored transactions can be launched from the GUI (based on user interactions with the graphical transaction flow diagrams. For instance, as shown in FIG. 7A, a user can interact with a particular graphical element (e.g., 625) causing a window or menu (e.g., 705) to be presented allowing a user to perform one or more tasks relating to the corresponding transaction instance, transaction fragment, and/or software component. For instance, a user can navigate to a view of a corresponding transaction data frame (e.g., from one or more transaction fragments in which software component accountControl participated), can navigate to a view of software code corresponding to the transaction fragment (e.g., software code of accountControl generally or a specific portion of accountControl utilized in the transaction fragment and/or transaction instance), cause additional attributes of the corresponding transaction or transaction fragment to be displayed (e.g., transaction timing information), among other examples.

In some implementations, as shown in FIG. 7A, a user can tag a transaction fragment or software component via the GUI of the transaction analysis system. For instance, using menu 705, a user can request that a tag be created to be associated with the software component (i.e., accountControl) corresponding to graphical element 625. The tag can be automatically linked to the user that creates the tag. Linking the tag to the user can make the tag private to the user (and/or a group of particular users including the user). In other instances, the tag can be shared with other users or be created as a public tag viewable by any user within a system, among other examples.

As shown in FIG. 7B, a graphical tag 710 can be displayed together with the corresponding graphical element 625 following its creation. This can assist users in identifying the tagged element, as well as the significance of the tagged portion of the transaction (i.e., why it was selected for tagging by the user). A user can thereby easily identify and return to the tagged portion of the transaction when analyzing the transaction using the graphical transaction flow diagram 605. In cases where the tag is private to a particular user or group of users, the graphical tag 710 is only visible to these users when viewing the graphical transaction flow diagram 605. The graphical tag 710 can be hidden from other users not linked to the tag when they access and view the same graphical transaction flow diagram 605. A user can interact with the graphical tag 710 representing the tag to perform actions relating to the tag as well as view additional information relating to the tag. A user can add, create, or link additional information that can be attached to the tag to provide additional contexts or notes describing the reason behind the tag. Such information can be displayed through interaction with the tag. Further, this additional information can be added or modified by interacting with the graphical tag 710. Additionally, a user can manage the sharing of the tag via interactions with the graphical tag 710, such as restricting other users, sharing the tag with other users (such that they can view and interact with the graphical tag and additional information associated with the tag), creating rules through which the tag can be automatically shared with other users, among other examples. In still other examples, a user can prompt the deletion of the tag by interacting with the graphical tag element 710, among other activities.

Figure 8:
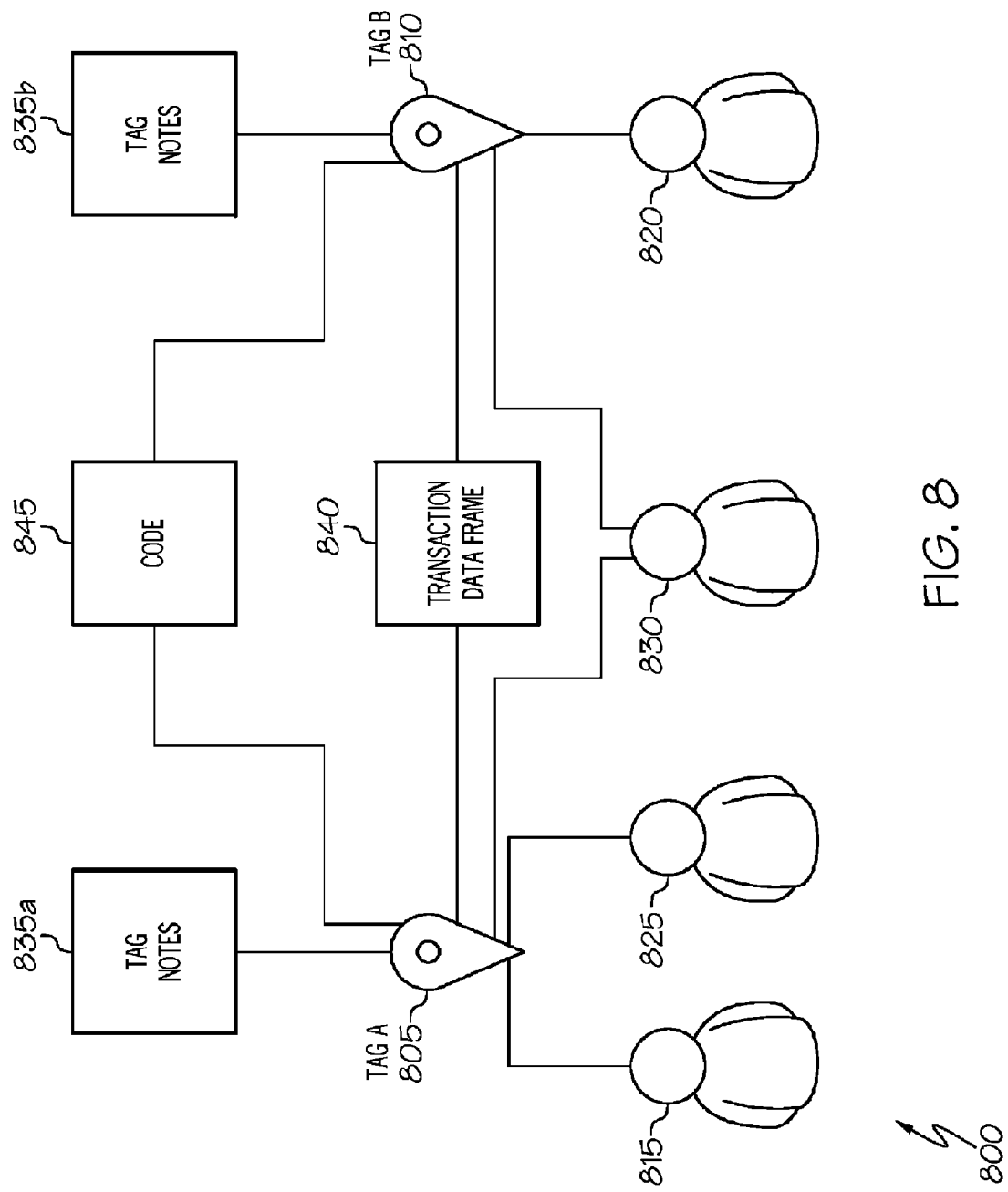
FIG. 8 is a simplified block diagram illustrating the tagging of a portion of a transaction flow in accordance with at least one embodiment.

FIG. 8 is a simplified block diagram 800 illustrating example features of tags that can be associated with portions of a transaction by a user. In this example, two distinct tags 805, 810 have been created by one or more different users. Each tag 805, 810 can be determined (e.g., based upon the graphical element tagged) to correspond to one or more particular transaction data frames 840 generated from monitoring of the corresponding transaction instance(s). Each tag 805, 810 can be further linked, either by creation or sharing of the tag, to one or more users (e.g., 815, 820, 825, 830) of the system. Some users (e.g., 830) may be linked to each of the tags 805, 810.

In addition to each tag 805, 810 being associated with a particular software component and/or transaction fragment (and corresponding transaction data frames 840), tags can be further linked to additional information. For instance, the creator of the tag can author tag notes (e.g., 835a,b) to describe factors associated with the respective tag. Subsequent viewers of the tag (e.g., other users with whom the tag has been shared or the original author) may edit or add to the content of the tag notes 835a,b. In some cases, the transaction analysis system can additionally identify, automatically, the code 845 of the software component(s) corresponding to the tagged software component and/or transaction fragment. These associations between the tag 805, 810, corresponding tag notes 835*a,b*, transaction data frame(s) 840, and the actual software component code 845, can form the basis for a tag (e.g., 805, 810) enabling easy analysis of the corresponding portion of a transaction. As an example, a user may share a particular tag (e.g., 805) with another user in connection with a test, debug, or other development activity. In one example, sharing the tag can include the automated generation of an email or other form of electronic message that includes a link to the graphical transaction flow diagram in which the tag appears or simply the tag data itself. From the tag, the receiving user can easily navigate to any one of the corresponding tag notes (e.g., 835*a*), transaction data frames (e.g., 840), software code 845, among other potential information related to the tagged portion of the transaction.

Figure 9:
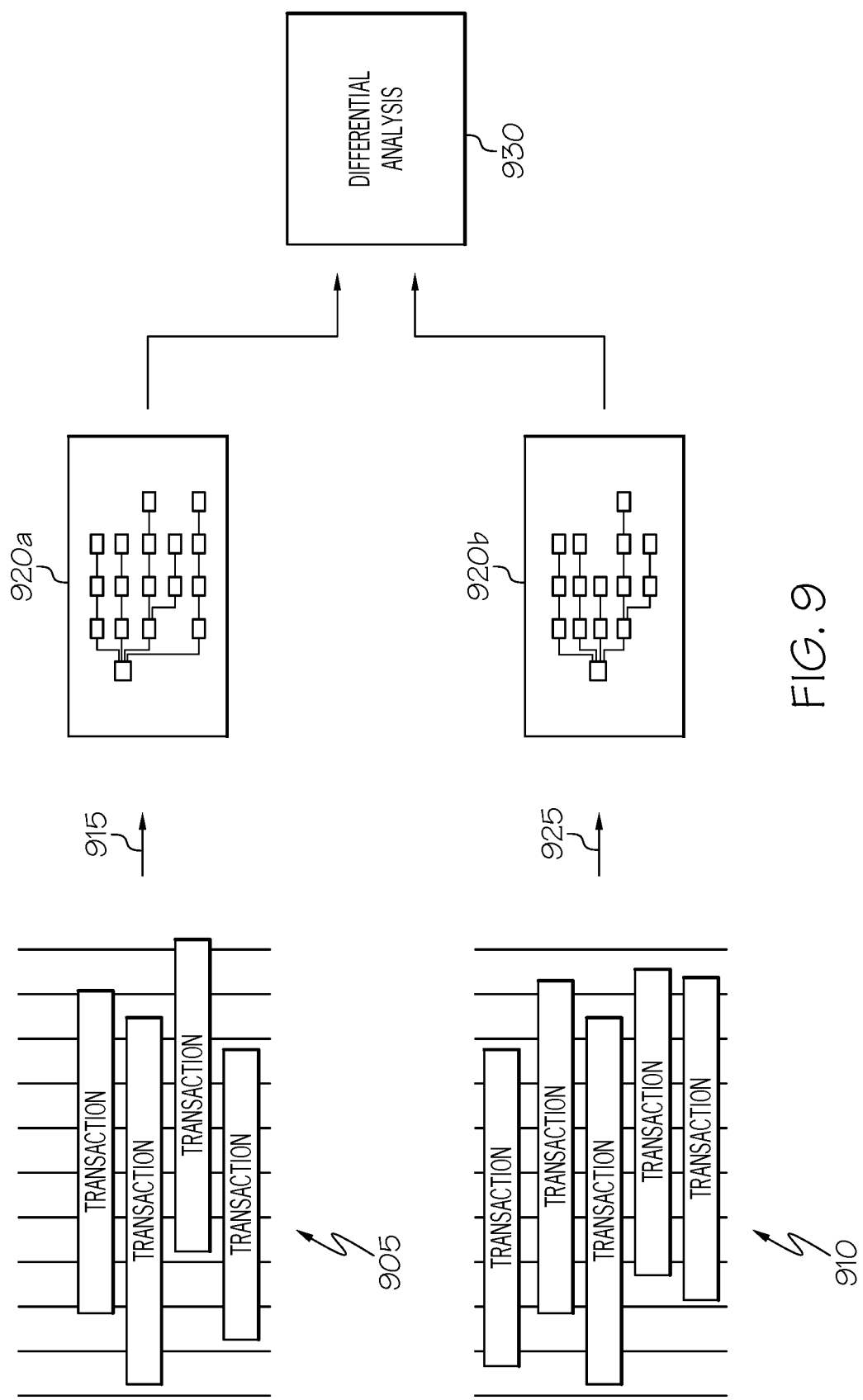
FIG. 9 is a simplified block diagram illustrating an example differential analysis of transaction flows in accordance with at least one embodiment.

Turning to FIG. 9, a simplified block diagram 900 is shown illustrating an example differential analysis to determine deltas between the transaction flows as determined from transactions monitored at two different points in time. A first collection of transactions 905 involving a particular software system or software component of the system may be monitored during a first period or window of time. At a later time, a second collection of transactions 910 may be monitored that involve the particular system. Corresponding transaction data may be generated for each of the transactions monitored during each of the windows of time (e.g., at 905 and 910). As in the other examples described herein, the transaction data generated in connection with agent monitoring of the system's transactions can be used to determine 915, 925 one or more transaction flows for the system. In some cases, a set of transaction flows (e.g., 920*a,b*) can be determined to represent the full functionality or architecture of the system (or software component of the system). For instance, a first set of transaction flows 920*a* can be generated 915 from the transaction data generated to describe the transactions 905 as monitored during the first period of time. Similarly, a second set of transaction flows 920*b* can be generated 925 from the transaction data generated to describe the transactions 910 as monitored during the later period of time.

In some instances, the monitored software system and transactions can change over time, such as through iterative development of the software system and corresponding changes made to the system. These changes can be manifest in the respective transaction flows (e.g., 920*a,b*) determined from transaction data generated during the respective monitoring of the software system during these separate windows of time. Accordingly, the respective graphical transaction flow diagrams generated to represent the different transaction flows can reflect these differences. These differences, or deltas, can include the presence or absence of a particular transaction fragment or transaction, the presence or absence of a particular software component in one or more of the transactions, as well as differences in performance attributes of the monitored transactions (e.g., differences in performance metrics between past and future instances of the same transaction or transaction fragment), among other examples. The deltas can be identified by generating graphical transaction flow diagrams from the first previously monitored transactions and the current (or otherwise later) monitored transactions. However, in many cases, it may not be straightforward for a user to manually detect the differences from a simple comparison of the two graphical transaction flow diagrams generated based on the two sets of transaction data (e.g., from transactions 905, 910).

In some implementations, a transaction analysis system can include logic to perform a differential analysis 930 to detect all differences between two or more sets of transaction flows (e.g., 920*a,b*). The detected differences can be highlighted in generated graphical transaction flow diagrams to assist the user in pinpointing where and how the transactions and transaction flows (e.g., 920*a,b*) differ. These differences can also represent the difference between the software system architecture as monitored during a first time period (e.g., at 905) and the second time period (e.g., at 910). A user can thereby determine what modifications, functionally and architecturally, have been made to the software system between the two monitoring windows (e.g., at 905 and 910). The differential analysis can also detect differences in the performance metrics detected during the monitored transactions and cause these differences to also be presented to a user. These differences in performance metrics can further assist the user in determining how the intervening modifications to the software system have affected the operation and quality of the software system.

Figure 10A:
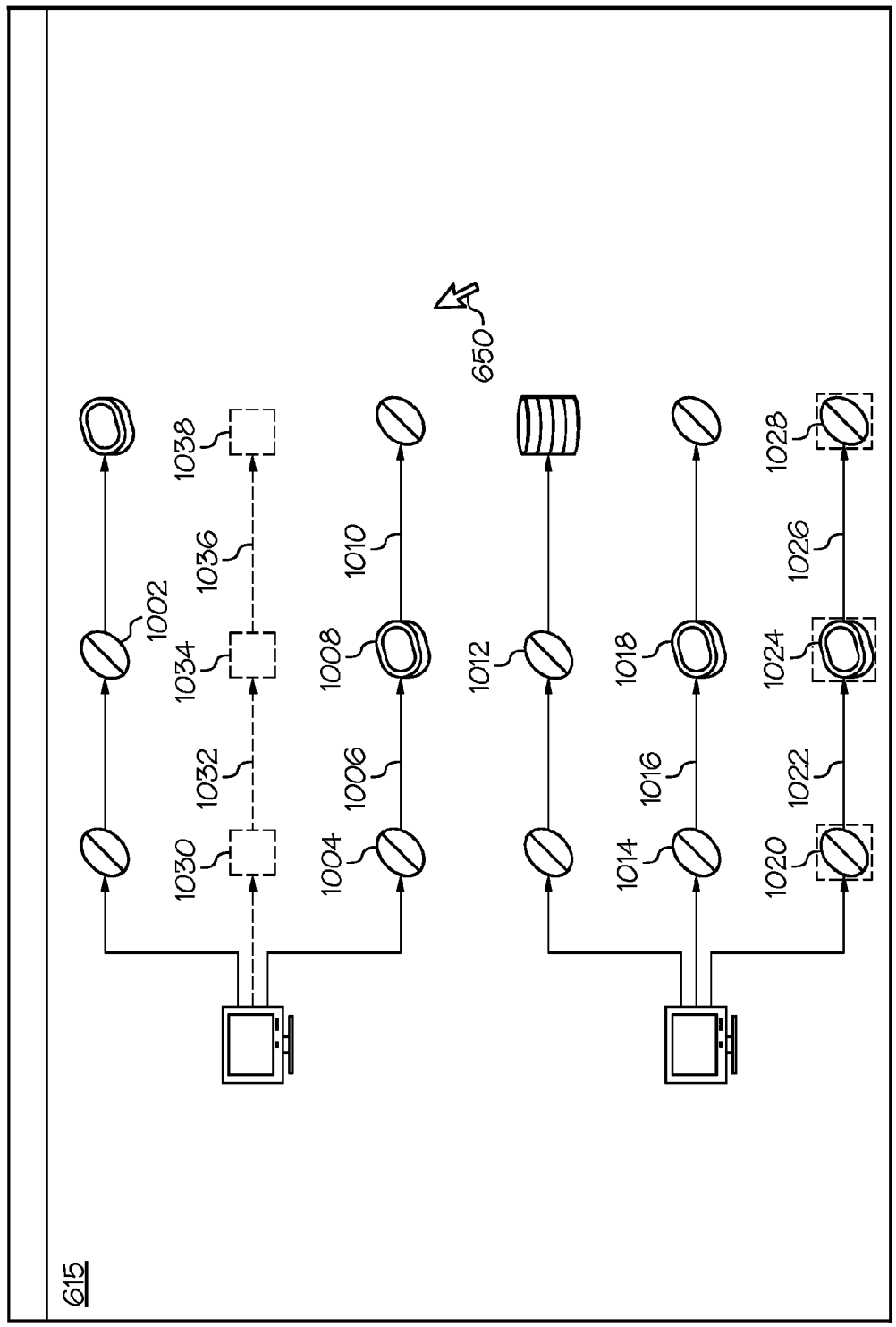
Figure 10B:
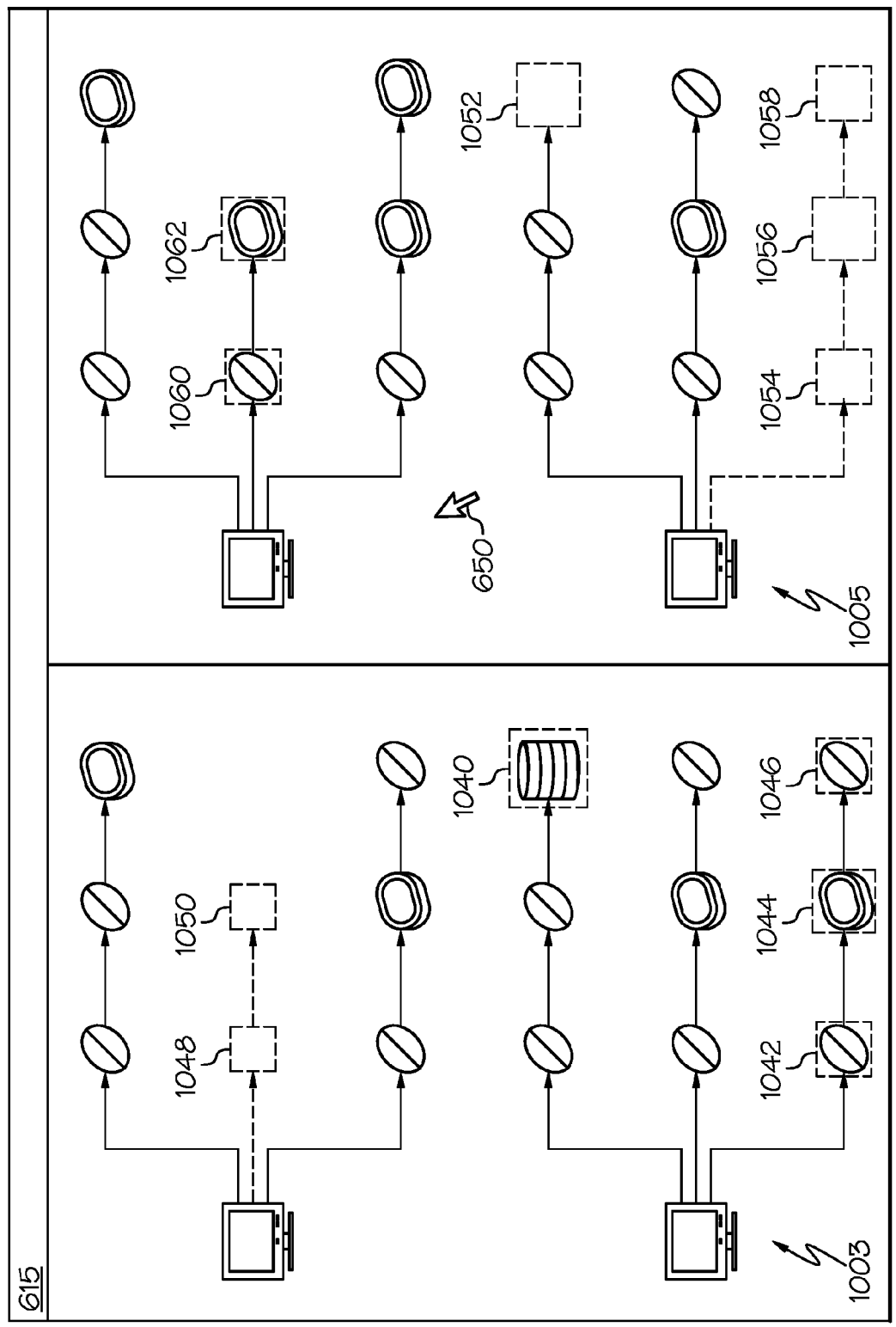
Figure 11:
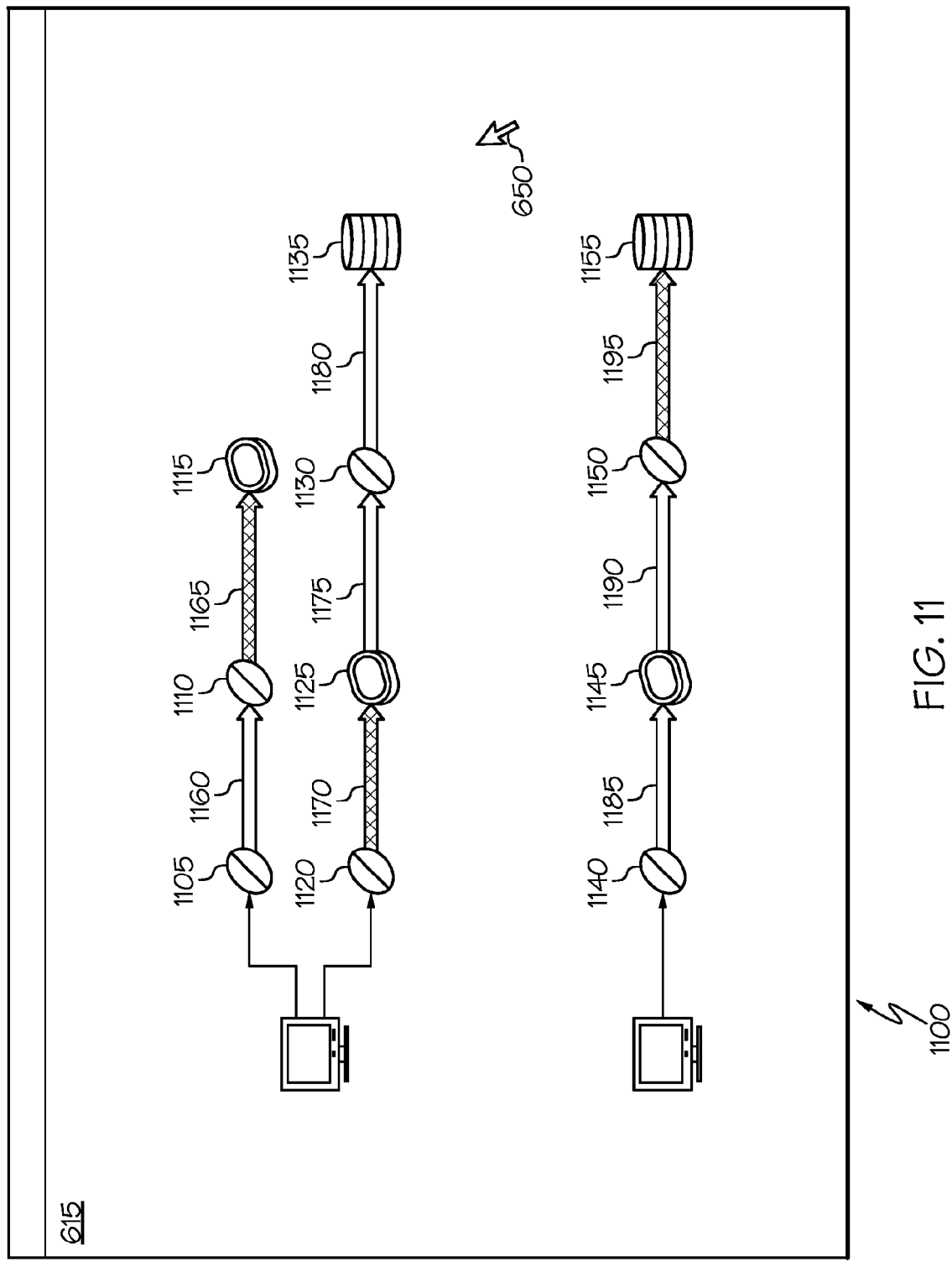
FIG. 11 is a screenshot of an example graphical user interface augmenting graphical transaction flow diagrams with performance metrics in accordance with at least one embodiment.

Turning to FIGS. 10A-11, screenshots are shown illustrating simplified example GUIs in which graphical transaction flow diagrams are presented and augmented to identify deltas determined between sets of transactions monitored by a transaction analysis system. For instance, in FIG. 10A, a transaction flow diagram 1001 is presented within a GUI window 615 to illustrate transaction flows identified during monitoring of a particular software system during a first window of time. In this example, the transaction flow diagram 1001 incorporates flows of two or more transactions detected for the particular software system during the first window. As with other graphical transaction flow diagrams, the graphical transaction flow diagram 1001 includes graphical elements (e.g., 1002, 1104, 1008, 1012, 1014, 1018, 1020, 1024, 1028) representing individual software components detected as participating in the transactions monitored during the first window, as well as graphical connector elements (e.g., 1006, 1010, 1016, 1022, 1026) representing individual transaction fragments of the transactions. The software system can be monitored at a second, later time, and another set of transactions can be identified. A differential analysis can be performed to compare the transaction flows determined from transaction data generated during the monitoring in the first and second periods. Deltas can be determined and the graphical transaction flow diagrams can be augmented to show some of these deltas. For instance, in the example of FIG. 10A, graphical elements 1020, 1024, 1028 can be highlighted in the presentation of the graphical transaction flow diagram 1001 corresponding to the first monitoring period. These highlights can indicate that the software components and transaction fragments corresponding to elements 1020, 1024, 1028 are included in transactions detecting during the first monitoring of the system, but were absent from the monitoring of the system during the second period. Additional elements (e.g., 1030, 1032, 1034, 1036, 1038) can be presented in window 1001 to indicate transaction fragments that were detected in the second monitoring period but not in the first monitoring period. Similar augmentations can be made to graphical transaction flow diagrams generated to correspond to the transaction data from the second monitoring window. These augmentations can allow a user to quickly identify at least some of the deltas determined from the differential analysis.

FIG. 10B shows another example of a graphical representation of transaction flows and the differences detected between transaction flows of a particular system as monitored during two different periods of time. In this example, transaction flow diagrams 1003, 1005 are presented side-by-side, the first transaction flow diagram 1003 corresponding to transactions of a system as observed during a first monitoring window and the second transaction flow diagram 1005 corresponding to transactions of the system as observed during a second monitoring window (e.g., after certain changes have been made to the system). Further, each of the presented transaction flow diagrams 1003, 1005 can be augmented to highlight deltas between the two sets of observed transactions. For instance, transaction flow diagram 1003 can include highlighted elements 1040, 1042, 1044, 1046 indicating elements and/or transaction fragments that "disappeared" from the transactions of the system between the first and second monitoring periods. Additional elements (e.g., 1048, 1050) can be presented in transaction flow diagram 1003 to indicate transaction fragments and participating software components observed during the second monitoring window but not in the first monitoring window. Similarly, transaction flow diagram 1005 can be presented to indicate the compliment of the deltas represented in transaction flow diagram 1003. For instance, elements 1052, 1054, 1056, 1058 can correspond to elements 1040, 1042, 1044, 1046, and indicate transaction fragments that were observed during the first monitoring window but not the second monitoring window. Likewise, elements 1060, 1062 can correspond to elements 1048, 1050 indicating the transaction fragments that are "new" or added to the system between the first and second monitoring windows, among other examples.

Turning to the example of FIG. 10C, the presentation of FIG. 10B is further augments to include graphical representations (e.g., 1063-1084) indicating differences in performance metrics determined for a system between transactions observed during the first and second monitoring periods. For instance, a particular metric can be selected, such as transaction timing indicating the amount of time observed for a respective software component to perform a transaction fragment, and graphical elements (e.g., 1063-1084) can be added to graphical transaction flow diagrams 1003, 1005 to indicate differences detected in the performance metric of the observed transactions in the first and second monitoring periods. In the example of FIG. 10C, for the transaction fragments and/or software components detected in both the first and second monitoring periods, graphical elements (e.g., 1063-1084) are presented to indicate whether a difference in a corresponding metric measurement was determined and whether the difference was positive or negative relative to the metric measurement determined for the same transaction fragment and/or software component in the other monitoring period.

For instance, in FIG. 10C, a downward arrow 1064 can be presented with graphical element 1085a representing a particular software component participating in transactions observed in both the first and second monitoring windows corresponding to the transaction flow diagrams 1003, 1005. Downward arrow 1064 can indicate that a particular performance metric value (e.g., transaction timing, memory usage, processor usage, etc.) detected during the first monitoring period is relatively worse than the value of the particular metric detected for the same transaction fragment during the second monitoring period. This difference may be due to changes made to the software system between the first and second monitoring periods. Accordingly, users can utilize such visualizations generated by a transaction analysis system to assess how iterative development of a software system has impacted its performance, among other example advantages. Further, elements, such as 1064, can be interactive, allowing users to select the elements to inspect details of the metric and explore reasons behind the difference. Additionally, a complimentary element (e.g., 1075) can be presented in the graphical transaction flow diagram 1005 corresponding to the other monitoring period, this element 1075 indicating the opposite change in the performance of software component 1085b (e.g., that the metric value was positive relative to that observed in the first monitoring period), as indicated by the upward arrow element 1075. Additional or alternative graphical elements can be presented (e.g., similar to those in the example of FIG. 10C) to indicate similar deltas in other observed performance metric values in the first and second monitoring periods, among other examples.

Performance metrics can be represented in graphical transaction flow diagrams using other techniques, such as illustrated in the example screenshot 1100 illustrated in FIG. 11. In the example of FIG. 11, transaction flows can be graphically represented by graphical elements (e.g., 1105, 1110, 1115, 1120, 1125, 1130, 1135, 1140, 1145, 1150, 1155, etc.) representing software components involved in the observed transactions and graphical connector elements (e.g., 1160, 1165, 1170, 1175, 1180, 1185, 1190, 1195, etc.) representing observed fragments of the transactions. In this example, connector elements (e.g., 1160, 1165, 1170, 1175, 1180, 1185, 1190, 1195) can be color-coded to indicate values of performance metrics detected for the respective observed transaction fragment. For instance, the color assigned to the connector element can indicate the relative performance metric value. For instance, the color can indicate that the performance metric value for a corresponding transaction fragment was relatively high (or low) compared to values of the performance metric determined for other transaction fragments observed within the same monitoring period. In other examples, the color-coding can indicate that a detected performance metric value for a corresponding transaction fragment disproportionally contributes, positively or negatively to the overall performance metric value determined for the transaction as a whole, among other examples. To illustrate, in one example, connector element 1165 can be coded in a first color to indicate that the corresponding transaction fragment took relatively longer to complete than other transaction fragments in the transaction. Other connector elements, such as element 1175, can be coded in another color to indicate that the corresponding transaction fragment completed in relatively less time, among other examples.

Figure 12:
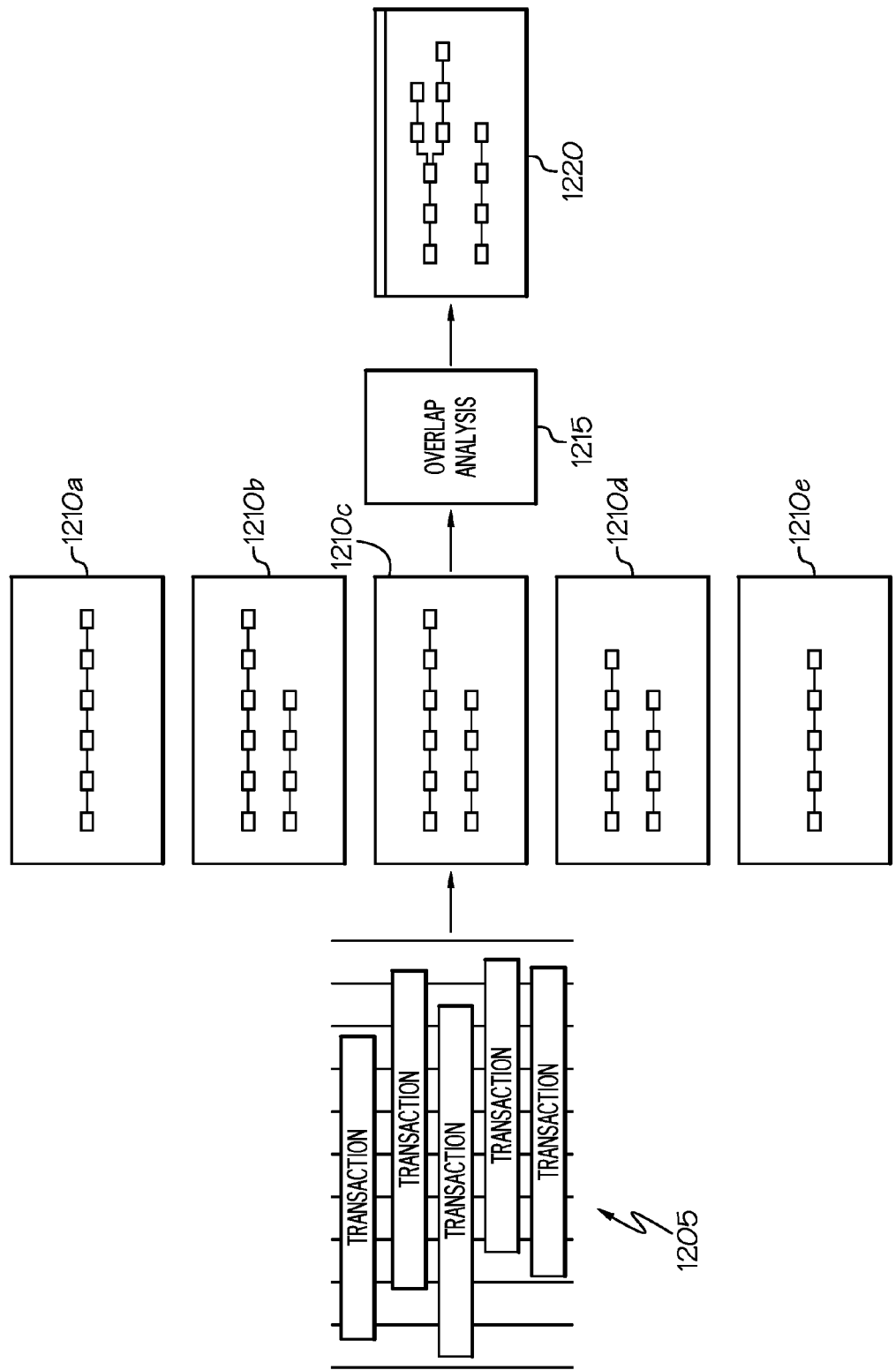
FIG. 12 is a simplified block diagram illustrating an example traffic analysis of transaction flows in accordance with at least one embodiment.

Turning to FIG. 12, graphical transaction flow diagrams discussed herein can be further enhanced to present information detected by agents monitoring the corresponding transactions as performed by a software system. For instance, presentations of transaction flow diagrams can be enhanced to indicate what transactions or portions of transactions of a determined transaction flow are most heavily "trafficked" or occur at the highest frequency during the monitoring of a corresponding software system. For instance, a number of transactions 1205 can be observed during monitoring of a particular software system over a period of time. Some of the transactions 1205 can be instances of the same transaction or transaction type. Further, separate instances of the same transaction type may differ in flow (although the flows likely overlap given shared transaction fragment types common in each instance of the transaction type). As in other examples, transaction data generated from the monitoring of the transactions can be utilized to determine transaction flows (e.g., 1210a-e) of each of the monitored transactions 1205. The transaction analysis system can perform a transaction analysis 1215 to determine which transaction fragments and/or transactions were detected and at what frequency. A transaction flow diagram 1220 can be rendered for presentation on a display device to reflect the aggregate or complete potential transaction flows supported by the software system as observed during the monitoring. The transaction flow diagram can effectively show a composite of the flows 1210a-e determined for individual transactions of the software system and represent a more complete picture of the architecture and functionality of the monitored software system.

Figure 13A:
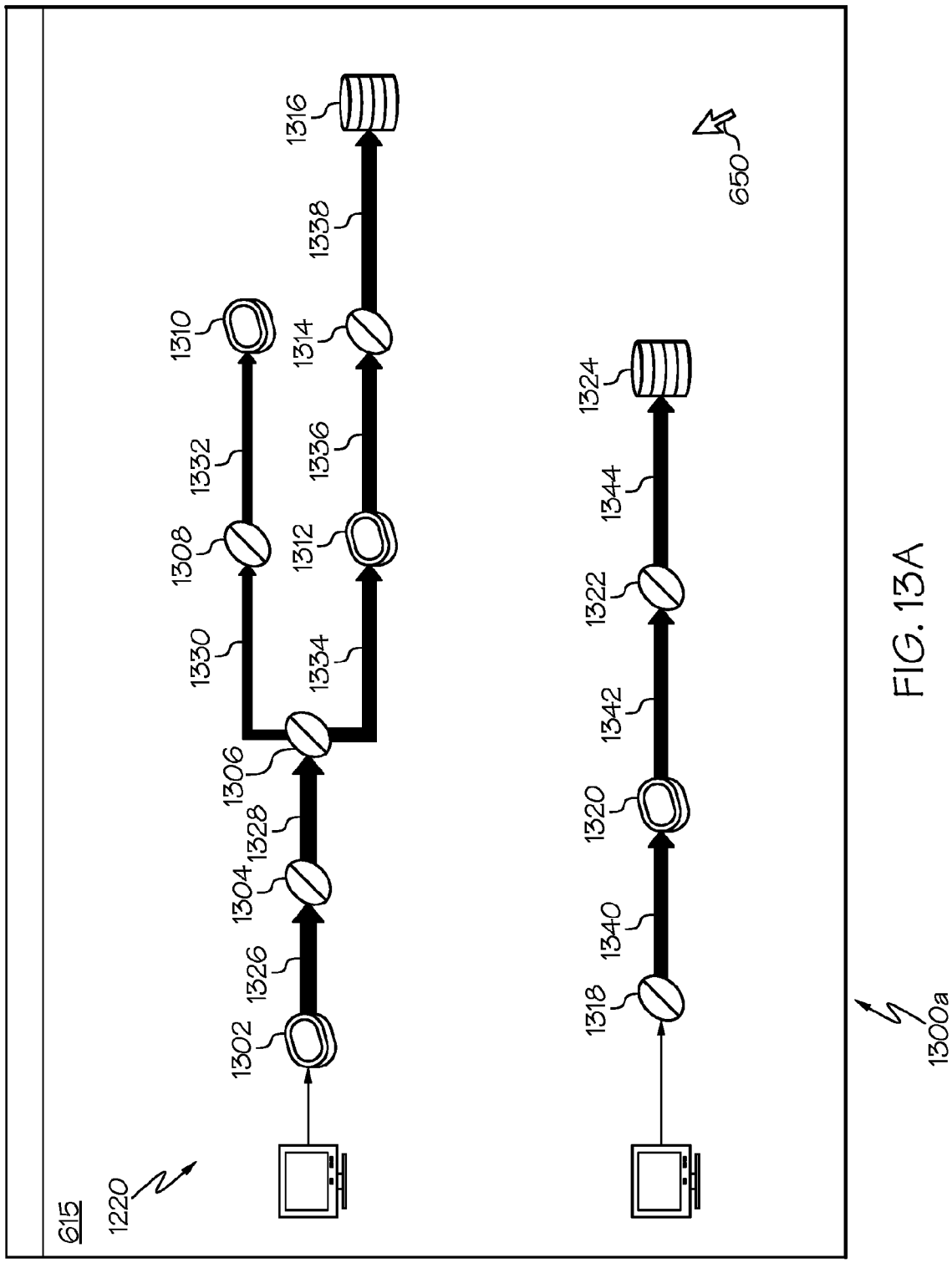
FIGS. 13A-13B are screenshots of example graphical user interfaces provided in connection with a transaction flow traffic analysis supported by a transaction analysis system in accordance with at least one embodiment.

FIG. 13A is a screenshot 1300a of a GUI window of a transaction analysis system that includes graphical transaction flow diagrams 1220 representing the combined transaction flows observed from monitoring a particular software system, such as introduced in the example block diagram 1200 of FIG. 12. As in other examples, the graphical transaction flow diagram 1220 can include graphical elements (e.g., 1302, 1304, 1306, 1308, 1310, 1312, 1314, 1316, 1318, 1320, 1322, 1324, etc.) representing participating software components of the particular system, as well as graphical connector elements (e.g., 1326, 1328, 1330, 1332, 1334, 1336, 1338, 1340, 1342, 1344, etc.) representing transaction fragments included in the flows of one or more transactions supported by the particular software system, as observed during the monitoring. As shown in FIG. 13A, in some implementations, the graphical transaction flow diagram 1220 can be enhanced to indicate the traffic, or frequency, or individual transaction fragments within the observed transaction flows. For instance, based on results of a traffic analysis performed by a transaction analysis system from transaction data and/or transaction flows determined from monitoring of the particular software system, graphical connector elements (e.g., 1326, 1328, 1330, 1332, 1334, 1336, 1338, 1340, 1342, 1344) can be formatted to be presented thicker, or with greater line weight, if the corresponding transaction fragment was observed at a higher frequency relative to other transaction fragments in the observed transactions. Likewise, connector elements (e.g., 1326, 1328, 1330, 1332, 1334, 1336, 1338, 1340, 1342, 1344) representing transaction fragments (and portions of transaction flows) that we observed less frequently during the monitoring can be formatted to have a thinner weight. These enhancements can indicate to a user, which transaction flows are most common during operation of the system (at least within a particular monitoring period), providing insights into which paths might be most sensitive to disruption, which paths are less popular, among other examples.

Figure 13B:
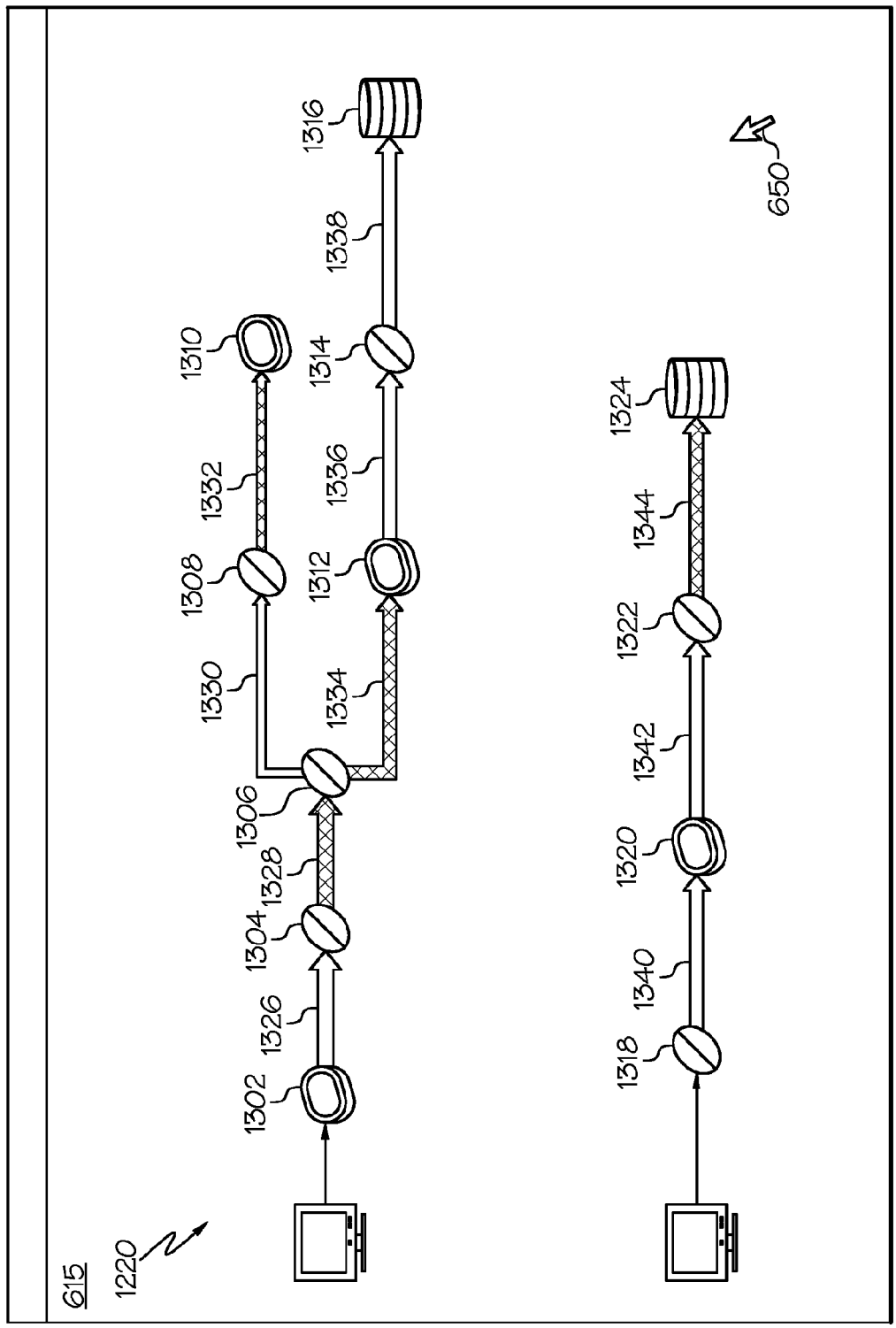

Turning to FIG. 13B, two or more of the above-discussed enhancements to graphical transaction flow diagram can be combined within a single GUI presentation to allow users to "layer" analyses of software system transactions and develop additional insight of the subset system. For instance, in one example shown in FIG. 13B, the features discussed in the examples of FIGS. 11 and 13A can be combined, such that the graphical transaction flow diagram 1220 is formatted (e.g., in response to a user selection of such display options) to indicate both the relative traffic observed for each transaction fragment (as in FIG. 13A by formatting the thickness of corresponding connector elements 1326, 1328, 1330, 1332, 1334, 1336, 1338, 1340, 1342, 1344) and relative performance metric values (e.g., relative transaction timing) of each transaction fragment (as in FIG. 11 by color-coding connector elements (e.g., 1326, 1328, 1330, 1332, 1334, 1336, 1338, 1340, 1342, 1344) to indicate their actual or relative performance metric values). For instance, connector element 1328 is formatted with a relatively wide thickness and a particular color to indicate, one, relative high traffic for the corresponding transaction fragment and relatively low performance. As another example, connector element 1330 is formatted with a relatively thin thickness and a second color, the thickness indicating that the corresponding transaction fragment was one of the least frequently occurring transaction fragments during a corresponding monitoring of the system and the color format indicating that observed performance metric values for the transaction fragment were relative favorable, among other examples.

Figure 14A:
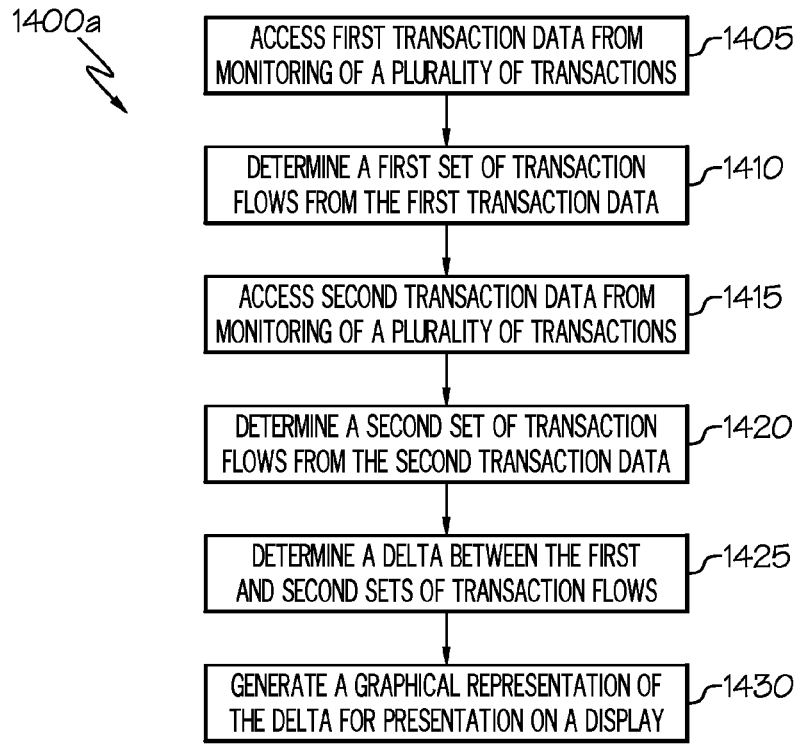
FIGS. 14A-14D are simplified flowcharts illustrating example techniques in connection with visualizing transaction flows in accordance with at least one embodiment.

FIGS. 14A-14D are simplified flowcharts 1400a-d illustrating example techniques for visualizing transaction flows in accordance with at least some implementations. In the example of FIG. 14A, first transaction data is accessed 1405 that documents transactions of a software system observed (e.g., by agents instrumented on the software system) during a first monitoring over a first period, or span, of time. Transaction flows of the transactions observed during the first period can be determined 1410 from the first transaction data.

Transaction flows can describe how the transaction flows from software component to software component, transaction fragment to transaction fragment.

During a later, second period of time, the software system can again be monitored (e.g., by at least some of the same agents used in the monitoring in the first period) and second transaction data generated that documents the transactions observed during the second period. The second transaction data can be accessed 1415 and used to determine 1420 transaction flows of the transactions observed during the second period. The transaction flows determined for the transactions observed in the first and second periods can be compared by a transaction analysis system to determine 1425 a delta, or one or more differences, between the sets of transaction flows determined for the transactions detected during the first and second periods. In some cases, the determined delta can be minimal, for instance, when the software system code is identical in both monitoring periods. In other cases, a variety of differences can be detected from the determined transaction flows and related transaction data, such as when one or more updates, patches, or other modifications have been made to the software system between the first and second monitoring periods. Such differences can include the addition or removal of transactions, transaction branches, and transaction fragments from the two sets of transaction flows, the addition or removal of one or more software components documented as participating in the transactions, as well as performance attributes detected within the transactions monitored within the two periods, among other examples. A graphical representation of the delta can be generated 1430, which graphically represents one or both sets of transaction flows from the two monitoring periods as well as graphically highlights the differences between the two sets of transaction flows. The highlighted differences, as with other graphical elements used to construct the graphical representation, can be interactive. For instance, a user can interact with highlighted elements of the graphical representation to navigate to or otherwise view additional information relating to the determined differences. For instance, interaction with a graphical element highlighting a difference between transaction flows of two temporally different monitoring periods can be selected by a user to cause code corresponding to the determined difference to be presented to the user. In some cases, interaction with the graphical representation can cause a view of the present version of the relevant code (e.g., corresponding to the second monitoring period) to be presented together with a prior version of the code (e.g., corresponding to the first monitoring period), to allow users to investigate the precise source of the determined delta(s).

Figure 14B:
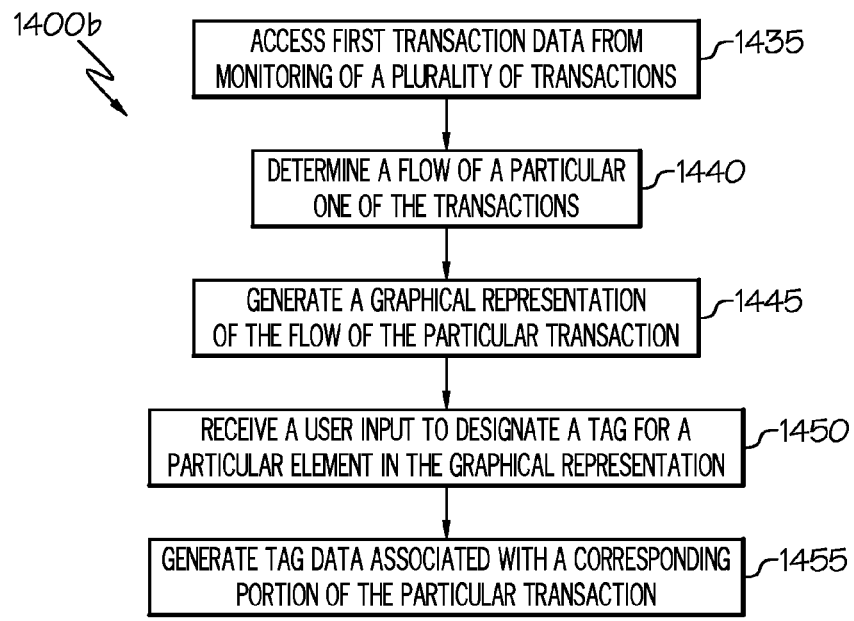

Turning to FIG. 14B, transaction data can be accessed 1435, which was generated from monitoring the transactions of a software system (e.g., by a set of agents instrumented on components of the system). A flow of at least a particular one of the transactions can be determined 1440 from the transaction data and graphical representation of the transaction flow can be generated 1445. The graphical representation can include graphical elements that represent the fragments of the particular transaction as well as the individual software components documented as having participated in these transaction fragments, A user can interact with the graphical representation, such as by interacting with a particular one of the graphical elements representing a particular transaction fragment or software component of immediate interest to the user. For instance, the user can be developer utilizing a transaction analysis system to perform one or more development tasks relating to the system. In some implementations, a user can interact with the graphical representation to submit an input (e.g., 1450) requesting that a tag be assigned to a particular one of the graphical elements and thereby also the represented software component or transaction fragment. The input can be received 1450 and corresponding tag data generated 1455. The tag data can be associated with the user, or a group of users, to define permissions for viewing and accessing the tag data. For instance, assigned tags can be graphically represented to correspond with corresponding graphical elements in the graphical representation. These tag elements can also be interacted with to allow users to view data linked to the tag. Tags can serve as a mechanism for annotating graphical representations of various transaction flows determined from transaction data generated and collected in connection with one or more monitoring periods.

Figure 14C:
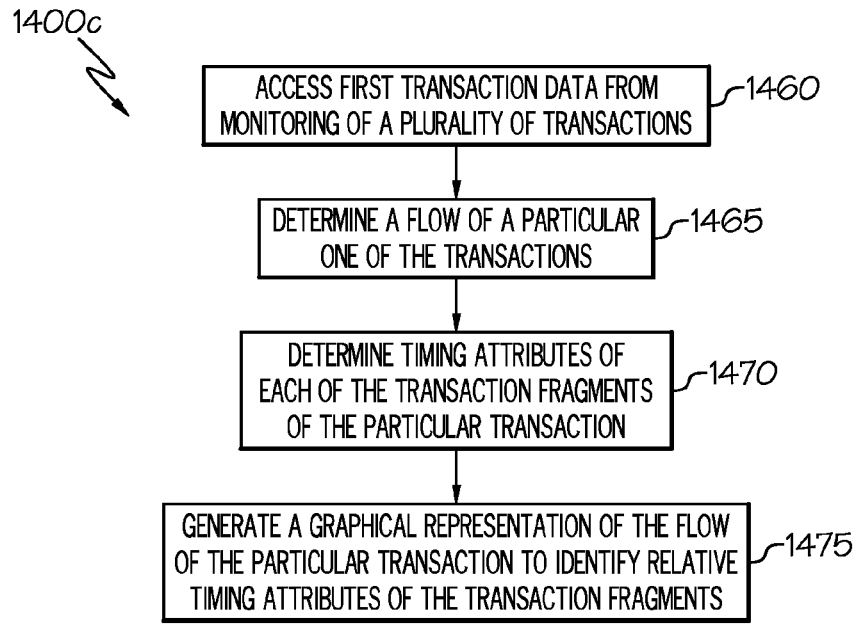

Turning to FIG. 14C, transaction data can be accessed 1460, which documents transactions observed during monitoring of a corresponding software system (e.g., by a collection of agents). A flow of a particular one of the transactions can be determined 1465 from the transaction data together with various performance attributes of the transaction fragments and software components participating in the particular transaction. In some instances, the performance attributes can include timing information identifying the time taken to complete each transaction fragment, among other examples. A graphical representation of the flow of the particular transaction can be generated 1475 to include graphical indications of the relative performance attribute values of the transaction fragments and software components in the particular transaction. These indications can be utilized to assist users in understanding the drivers of performance attributes of the transaction (or system) as a whole. In some cases, the indicators indicate the relative performance of a transaction fragment or software component, as compared against previously recorded attribute values or the attributes values of other transaction fragments or software components the transaction. In some cases, the graphical representation can indicate these attribute values (such as timing attributes) by color-coding the graphical connector elements representing corresponding transaction fragments, with some colors indicating favorable values or performance and other colors indicating unfavorable values or performance, among other examples.

Figure 14D:
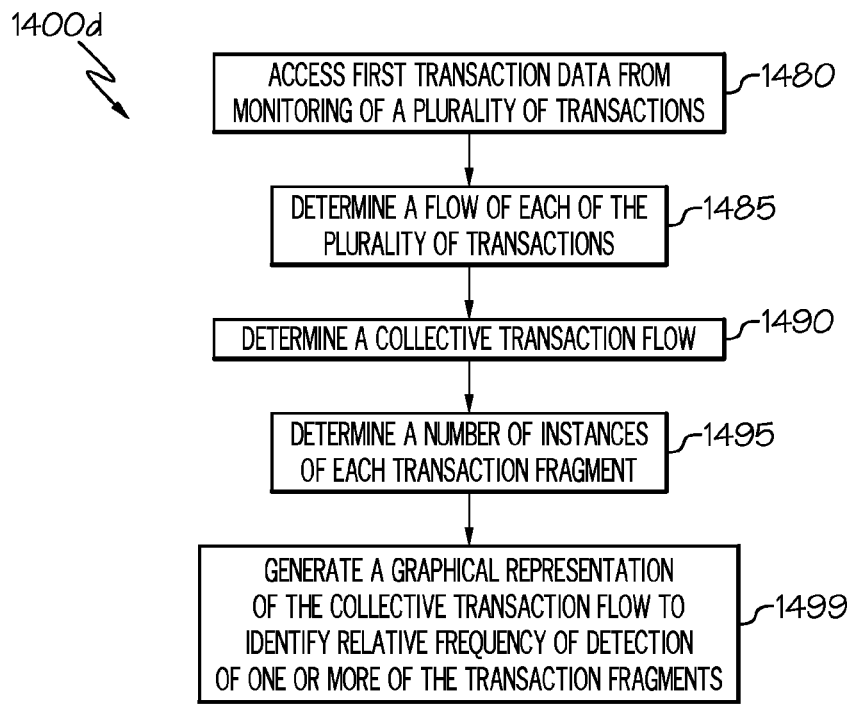

Turning to FIG. 14D, transaction data can be accessed 1480 documenting a plurality of observed transactions of a particular type. A flow of each of the transactions can be determined 1485 from the transaction data as well as a collective transaction flow (at 1490) for the genus of transactions of this particular type. For instance, the flow of a single transaction type may potentially take multiple different paths or branches, with some flow paths dependent on the results of upstream transaction fragments. Accordingly, different flows can be observed for different instances of the same transaction, each flow made up of a respective set of transaction fragments involving a corresponding set of software components. A collective transaction flow can document all of the possible branches of a transaction, as observed in the variant transaction flows of the individual instances of the transaction. The collective transaction flow can account for each transaction fragment and all participating software components observed in any of the detected instances of the transaction type.

As instances of the same transaction fragment can be included in the flow of multiple instances of the transaction, the number of detected instances of each transaction fragments can be determined 1495 (e.g., from the set of determined transaction flows and/or underlying transaction data). A graphical representation of the collective transaction flow can be generated 1499 and include graphical block elements representing each of the software components in the collective transaction flow and graphical connector elements representing each of the transaction fragments in the collective transaction flow. The graphical connector elements can be formatted to reflect the number of observed instances, or frequency, of the corresponding transaction fragment. For instance, the width, or thickness, of the graphical connector elements can reflect the relative frequency of the corresponding transaction fragment (e.g., with a thicker line representing a high rate of occurrence of the transaction fragments). By formatting the graphical connector elements in this manner, the "traffic" within a transaction or set of transactions can be observed, including which of the potential transaction branches and fragments in a collective transaction flow are more frequent than others, among other examples.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
accessing transaction data generated during monitoring of a plurality of transactions involving a plurality of software components in a system;
determining, from the transaction data, a flow of a particular one of the plurality of transactions, wherein the flow of the particular transaction describes involvement of a particular set of the plurality of software components in the particular transaction and a plurality of transaction fragments of the particular transaction;
determining a duration of each of the plurality of transaction fragments;
determining a relative duration of a particular one of the plurality of transaction fragments based on the duration of the particular transaction fragment, wherein the relative duration is relative to a duration of another instance of the particular transaction fragment in another transaction previous to the particular transaction; and
generating a graphical representation of the flow for presentation in a graphical user interface, wherein the graphical representation comprises a set of graphical block elements and a set of graphical connector elements, each of the graphical block elements representing a respective one of the plurality of software components, each of the graphical connector elements representing a respective one of the plurality of transaction fragments and connecting the graphical block elements of the respective software components involved in the corresponding transaction fragment, and a particular one of the graphical connector elements representing the particular transaction is formatted to indicate the relative duration determined for the particular transaction fragment.

2. The method of claim 1, wherein formatting the particular graphical connector element comprises coloring-coding the particular graphical connector element to identify the relative duration of the particular transaction fragment.

3. The method of claim 2, wherein a first color-coding is to indicate a relatively long duration and a second color-coding is to indicate a relatively short duration.

4. The method of claim 1, wherein each of the graphical connector elements is formatted according to the respective duration determined for the corresponding transaction fragment.

5. The method of claim 1, further comprising:
determining a number of instances of each transaction fragment observed in the plurality of transactions during the monitoring; and
formatting width of each of the graphical connector elements based on the number of observed instances of the corresponding transaction fragment.

6. A method comprising:
accessing transaction data generated during monitoring of a plurality of transactions of a particular type, wherein the plurality of transactions involve a plurality of software components in a system and each transaction comprises a respective subset of a plurality of transaction fragments observed in the plurality of transactions;
determining, from the transaction data, a respective transaction flow for each of the plurality of transactions, wherein each transaction flow identifies a respective order of the transaction fragments of the corresponding transaction and the software components that participated in the transaction;
determining a collective transaction flow for the particular type of transaction representing a union of the transaction flows determined for the plurality of transactions;
determining a number of instances of each of the plurality of transaction fragments observed during the monitoring, wherein the number of instance of a first one of the plurality of transaction fragments is different from the number of instances of a second one of the plurality of transaction fragments; and
generating a graphical representation of the collective transaction flow to comprise a plurality of graphical block elements and a plurality of graphical connector elements, wherein each of the graphical block elements represents a respective one of the plurality of software components, each of the graphical connector elements represents a respective one of the plurality of transaction fragments and connects the graphical block elements of the respective software components involved in the corresponding transaction fragment, and a particular one of the each of the graphical connector elements is formatted according to the respective determined number of instances of the corresponding transaction fragment, wherein the graphical connector element representing the first transaction fragment is formatted differently than the graphical connector element representing the second transaction fragment.

7. The method of claim 6, wherein formatting the graphical connector elements comprises formatting thickness of each graphical connector element based on the respective number of instances of the corresponding transaction fragment represented by the graphical connector element.

8. The method of claim 7, wherein formatting the graphical connector element with a greater thickness correlates with a higher number of determined instances of the corresponding transaction fragment.

9. The method of claim 7, wherein the thickness of a graphical connector element indicates a relative frequency of the corresponding transaction fragment during the monitoring.

10. The method of claim 9, wherein the relative frequency is relative to a previously recorded frequency of the corresponding transaction fragment in a previous transaction.

11. The method of claim 9, wherein the relative frequency is relative to frequency of other transaction fragments in the plurality of transaction fragments during the monitoring.

12. The method of claim 7, further comprising determining duration of each of the plurality of transaction fragments, wherein the graphical connector elements are further formatted based on the duration determined for the corresponding transaction fragment.

13. The method of claim 12, wherein the graphical connector elements are color-coded based on the duration determined for the corresponding transaction fragment.

14. A computer program product comprising a computer readable storage medium comprising computer readable program code embodied therewith, the computer readable program code comprising:
- computer readable program code configured to access transaction data generated during monitoring of a plurality of transactions involving a plurality of software components in a system;
- computer readable program code configured to determine, from the transaction data, a flow of a particular one of the plurality of transactions, wherein the flow of the particular transaction describes involvement of a particular set of the plurality of software components in the particular transaction and a plurality of transaction fragments of the particular transaction;
- computer readable program code configured to determine a duration of each of the plurality of transaction fragments;
- computer readable program code configured to determine a relative duration of a particular one of the plurality of transaction fragments based on the duration of the particular transaction fragment, wherein the relative duration is relative to a duration of another instance of the particular transaction fragment in another transaction previous to the particular transaction; and
- computer readable program code configured to generate a graphical representation of the flow for presentation in a graphical user interface, wherein the graphical representation comprises a set of graphical block elements and a set of graphical connector elements, each of the graphical block elements representing a respective one of the plurality of software components, each of the graphical connector elements representing a respective one of the plurality of transaction fragments and connecting the graphical block elements of the respective software components involved in the corresponding transaction fragment, and a particular one of the graphical connector elements representing the particular transaction is formatted to indicate the relative duration determined for the particular transaction fragment.

15. A system comprising:
- a data processing apparatus;
- a memory device;
- a transaction path engine to:
  - determine, from transaction data generated during a monitoring of a software system, a number of instances of each of a plurality of transaction fragments;
  - determine durations for each instance of the plurality of transaction fragments, wherein a plurality of software components of the software system are involved in the plurality of transaction fragments; and
  - determine an average duration for each of the plurality of transaction fragments from the respective durations determined for the instances of the corresponding transaction fragment; and
- a graphical user interface (GUI) engine to generate a GUI to comprise a graphical representation of a transaction comprising the plurality of transaction fragments, wherein the graphical representation comprises a plurality of graphical block elements and a plurality of graphical connector elements, each of the graphical block elements represents a respective one of the plurality of software components, each of the graphical connector elements represents a respective one of the plurality of transaction fragments and connects the graphical block elements of the respective software components involved in the corresponding transaction fragment, and a particular one of the graphical connector elements representing a particular one of the plurality of transaction fragments is formatted according to represent the respective determined number of instances of the particular transaction fragment and further formatted to represent the determined average duration of the particular transaction fragment.

16. The system of claim 15, further comprising an agent manager to collect the transaction data from a plurality of agents instrumented in at least a portion of the plurality of software components.

17. The system of claim 16, further comprising the plurality of agents.

* * * * *